United States Patent
Kancharla et al.

(10) Patent No.: US 10,698,770 B1
(45) Date of Patent: Jun. 30, 2020

(54) REGIONALLY AGNOSTIC IN-MEMORY DATABASE ARRANGEMENTS WITH RECONNECTION RESILIENCY

(71) Applicant: Capital One Services, LLC, McLean, VA (US)

(72) Inventors: Gopi Kancharla, Frisco, TX (US); Kush Patel, Austin, TX (US); Nag Prajval Bindumalyam Chandrashekar, Little Elm, TX (US)

(73) Assignee: Capital One Services, LLC, McLean, VA (US)

( * ) Notice: Subject to any disclaimer, the term of this patent is extended or adjusted under 35 U.S.C. 154(b) by 10 days.

(21) Appl. No.: 16/380,179

(22) Filed: Apr. 10, 2019

(51) Int. Cl.
| | |
|---|---|
| G06F 11/14 | (2006.01) |
| G06F 16/909 | (2019.01) |
| G06F 9/00 | (2006.01) |
| G06F 9/38 | (2018.01) |
| G06F 9/50 | (2006.01) |
| G06F 9/46 | (2006.01) |

(52) U.S. Cl.
CPC ........ *G06F 11/1464* (2013.01); *G06F 9/3891* (2013.01); *G06F 9/467* (2013.01); *G06F 9/5016* (2013.01); *G06F 11/1453* (2013.01); *G06F 16/909* (2019.01); *G06F 2209/5011* (2013.01)

(58) Field of Classification Search
CPC .................................................. G06F 11/1464
USPC ........................................................ 711/162
See application file for complete search history.

(56) References Cited

U.S. PATENT DOCUMENTS

| | | | |
|---|---|---|---|
| 6,173,311 B1* | 1/2001 | Hassett | H04L 67/2814 709/202 |
| 7,657,581 B2* | 2/2010 | Orenstein | G06F 16/27 707/661 |
| 7,818,003 B2 | 10/2010 | Callaghan | |
| 8,856,091 B2* | 10/2014 | Wong | G06F 16/27 707/703 |
| 8,868,510 B2 | 10/2014 | Gurajada et al. | |
| 9,712,491 B2 | 7/2017 | Burns et al. | |
| 2003/0055826 A1* | 3/2003 | Graham | H04L 67/2819 |
| 2004/0088413 A1* | 5/2004 | Bhogi | G06F 9/5061 709/226 |
| 2006/0146878 A1* | 7/2006 | Srivastava | H04L 67/1029 370/469 |
| 2007/0168704 A1* | 7/2007 | Connolly | G06F 11/2025 714/6.1 |
| 2007/0198524 A1* | 8/2007 | Branda | H04L 67/1002 |
| 2007/0198684 A1* | 8/2007 | Mizushima | H04L 67/1002 709/223 |
| 2007/0239791 A1* | 10/2007 | Cattell | G06F 16/24552 |

(Continued)

OTHER PUBLICATIONS

Cecchet, Emmanuel, George Candea, and Anastasia Ailamaki. "Middleware-based database replication: the gaps between theory and practice." Proceedings of the 2008 ACM SIGMOD international conference on Management of data. 2008. (Year: 2008).*

(Continued)

*Primary Examiner* — Mohsen Almani

(57) ABSTRACT

Improvements of regionally agnostic in-memory database (DB) arrangements being equipped with reconnection resiliency arrangements. More particularly, improvements of in-memory DB arrangements able to self-regenerate new connection pool components, responsive to one or more connections of an active connection pool experiencing invalidity.

16 Claims, 14 Drawing Sheets

(56) References Cited

U.S. PATENT DOCUMENTS

| | | | | |
|---|---|---|---|---|
| 2008/0046400 A1* | 2/2008 | Shi | ............... | G06F 16/24532 |
| 2008/0104138 A1* | 5/2008 | Provo | ............... | G06F 9/4843 |
| 2009/0292953 A1* | 11/2009 | Barghouthi | ......... | G06F 11/1443 |
| | | | | 714/40 |
| 2011/0218981 A1* | 9/2011 | Retnakumari | ......... | G06F 9/544 |
| | | | | 707/705 |
| 2013/0066955 A1* | 3/2013 | Neel | ............... | G06F 11/1443 |
| | | | | 709/203 |
| 2014/0019628 A1* | 1/2014 | Shankar | ............ | G06F 9/541 |
| | | | | 709/228 |
| 2016/0306854 A1* | 10/2016 | Hegde | ............ | G06F 16/22 |
| 2019/0075183 A1* | 3/2019 | Silberkasten | ......... | G06F 16/21 |

OTHER PUBLICATIONS

Nakamura, Nobutatsu, et al. "A flexible replication mechanism with extended database connection layers." Fifth IEEE International Symposium on Network Computing and Applications (NCA'06). IEEE, 2006. (Year: 2006).*

* cited by examiner

REGIONALLY AGNOSTIC IN-MEMORY DATABASE ARRANGEMENTS WITH RECONNECTION RESILIENCY

TECHNICAL FIELD

Examples described herein are generally related to regionally agnostic in-memory database (DB) arrangements with reconnection resiliency, and more particularly, to in-memory DB arrangements able to self-regenerate new connection pool related components responsive to one or more connections of a currently active connection pool experiencing an incidence of invalidity.

BACKGROUND

In-memory DB arrangements are advantageous (e.g., over in-disk DB arrangements) in terms of a speed in answering DB access requests (e.g., post or write requests; get or read requests). Further, multi-regional in-memory DB arrangements operating in differing regions from one another are advantageous in that a plurality of DB instances are able to share the load of servicing of incoming requests. Still further, regionally-separated locations provide redundancy protection in that if a failure occurs (for example, by a disaster such as: earthquake; flood; tornado; power outage; terrorism) affecting operations of a DB located in a disaster-affected region, a DB located in a remote unaffected region can carry on with servicing incoming requests.

In order to further improve a speed in answering DB access requests (e.g., post or write requests; get or read requests), each DB instance may be provisioned (in advance of receipt of an access request) with a plurality of (i.e., a pool of) predefined connections useable for satisfying DB access requests. For example, if three predefined connections are provisioned with respect to a subject DB instance, an individual one of those predefined connections may be temporarily assigned (e.g., lent) for use in accessing the subject DB to satisfy an individual incoming access request (e.g., to post or write data into the DB, or to get or read data from the DB). Once that access request is satisfied or completed, that individual predefined connection may be returned to the pool of predefined connections to remain useable for satisfying additional future DB access requests.

Such pool arrangement is advantageous in that a setup-time-penalty for initially setting up each connection is performed in advance, before receiving access requests, such that a time for conducting each subsequent access request is shortened in that the access operation for an access request does not have to include the initial setup-time-penalty. Still further, since the predefined connections are recycled back into the connection pool after completing an access request, the initial setup-time-penalty for setting up each connection is only incurred once per connection, while the connection itself is then used to satisfy multiple access requests.

Despite the aforementioned advantages, there still exists a problem that one or more of the predefined connections may at times, be rendered permanently inoperable or unusable (i.e., invalid) as a result of any of plural possible causes. As one example, a physical path of a connection may become interrupted. As another example, network addressing may be reinitialized and changed due to a temporary loss of a network connection (e.g., due to a power outage).

Once a predefined connection becomes invalid, that connection is subsequently no longer useable to satisfy any incoming DB access request. The greater the number of pool connections which become invalid within a pool, the greater the inefficiency in using that pool of pool connections to access the subject DB. For example, if the invalid connection persists as a member of the pool and is again assigned to satisfy an access request, an attempted connection would not be successful, and then accommodations would have to be invoked to assign a differing connection to satisfy the access request. Such adds to the time to satisfy the access request, resulting in an increase in an average time for the pool to satisfy access requests. As a direr situation, if all the connections within a pool become invalid, then the DB may become inaccessible via those pool connections. What is needed is an arrangement having a reconnection resiliency ability for self-correcting or self-compensating for pool connections when one or more connection experiences an incidence of invalidity.

SUMMARY

Provided are arrangements regarding improvements of regionally agnostic in-memory database (DB) arrangements being equipped with reconnection resiliency arrangements, and more particularly, regarding improvements of in-memory DB arrangements able to self-regenerate new connection pool components, responsive to one or more connections of an active connection pool experiencing invalidity.

That is, one example embodiment is directed to a method of resiliently reconnecting during run-time, to an in-memory database (DB) within a multi-regional DB system responsive to a connection failure, the method comprising automated run-time operations of: attempting a transaction access to the in-memory DB providing DB access services to a first region, using a preconfigured connection obtained from a connection pool set which includes plural preconfigured connections which are pre-readied in advance of the attempting; monitoring for a failure connecting to the in-memory DB using the preconfigured connection; responsive to a detected said failure: causing the transaction access to be performed using a differing in-memory DB providing DB access services to a second region remote from the first region; discarding all the preconfigured connections in the connection pool set; and creating plural new preconfigured connections which are pre-readied to connect to the in-memory DB, to establish a renewed connection pool set for transaction accesses to the in-memory DB; attempting a subsequent transaction access to the in-memory DB in the first region using a new preconfigured connection obtained from the renewed connection pool set; and completing the subsequent transaction access upon connecting to the in-memory DB using the new preconfigured connection.

Another embodiment is directed to a transaction access application embodied on a non-transitory processor-readable medium, the transaction access application when executed performing functions comprising resilient run-time reconnecting to an in-memory database (DB) cluster in an event of a connection failure to the in-memory DB cluster, the transaction access application including automated run-time operations of: attempting a transaction access to the in-memory DB cluster using a preconfigured connection obtained from a connection pool set which includes plural preconfigured connections which are pre-readied in advance of the attempting to provide connection to the in-memory DB cluster, where the in-memory DB cluster provides DB access services using a first domain of a multi-domain system; detecting a failure in connecting to the in-memory DB cluster using the preconfigured connection; responsive to a detected said failure: causing the transaction access to be performed using a differing in-memory DB cluster which provides DB access services using a second domain different from the first domain; discarding all the preconfigured connections in the connection pool set; and creating plural new preconfigured connections to connect to the in-memory DB cluster, to establish a renewed connection pool set for transaction accesses to the in-memory DB cluster; attempting a subsequent transaction access to the in-memory DB cluster in the first domain using a new preconfigured connection obtained from the renewed connection pool set; and completing the subsequent transaction access upon connecting to the in-memory DB cluster using the new preconfigured connection.

Yet another embodiment is directed to a regional database (DB) system deployable in a multi-regional system, comprising: a hardware processor and non-transitory processor-readable medium configured to implement a regional DB application including functions for resilient run-time reconnecting to an in-memory DB cluster in an event of a connection failure to the in-memory DB cluster, the processor performing automated run-time operations of: pre-establishing a template in advance of attempting a transaction access, the template including a pointer pointing access to a connection pool set which includes plural preconfigured connections which are pre-readied to provide connection to the in-memory DB cluster, where the in-memory DB cluster is configured to provide DB access services using a first region of a multi-regional system; utilizing the pointer to access the connection pool set for obtaining a preconfigured connection from the plural preconfigured connections; attempting the transaction access to the in-memory DB cluster using the preconfigured connection; monitoring for a failure in connecting to the in-memory DB using the preconfigured connection; responsive to a detected said failure: causing the transaction access to be performed using a differing in-memory DB cluster which provides DB access services using a second region different from the first region; discarding all the preconfigured connections in the connection pool set, via eliminating the pointer; and creating plural new preconfigured connections to connect to the in-memory DB cluster, to establish a renewed connection pool set for transaction accesses to the in-memory DB cluster; re-establishing a new template pre-readied in advance of the attempting a subsequent transaction access, the new template including a new pointer pointing access to the renewed connection pool set; utilizing the new pointer to access the renewed connection pool set for obtaining a new preconfigured connection from the plural new preconfigured connections; attempting the subsequent transaction access to the in-memory DB cluster in the first region, using the new preconfigured connection obtained from the renewed connection pool set; and completing the subsequent transaction access upon connecting to the in-memory DB cluster using the new preconfigured connection.

It is to be understood that both the foregoing general description and the following detailed description are example embodiments and explanatory only and are not restrictive of the disclosed embodiments, as claimed.

DETAILED DESCRIPTION

Examples discussed herein are generally directed to the improvements of regionally agnostic in-memory database (DB) arrangements being equipped with reconnection resiliency arrangements, and more particularly, to the improvements of in-memory DB arrangements able to self-regenerate new connection pool components, responsive to one or more connections of an active connection pool experiencing invalidity.

Figure 1:
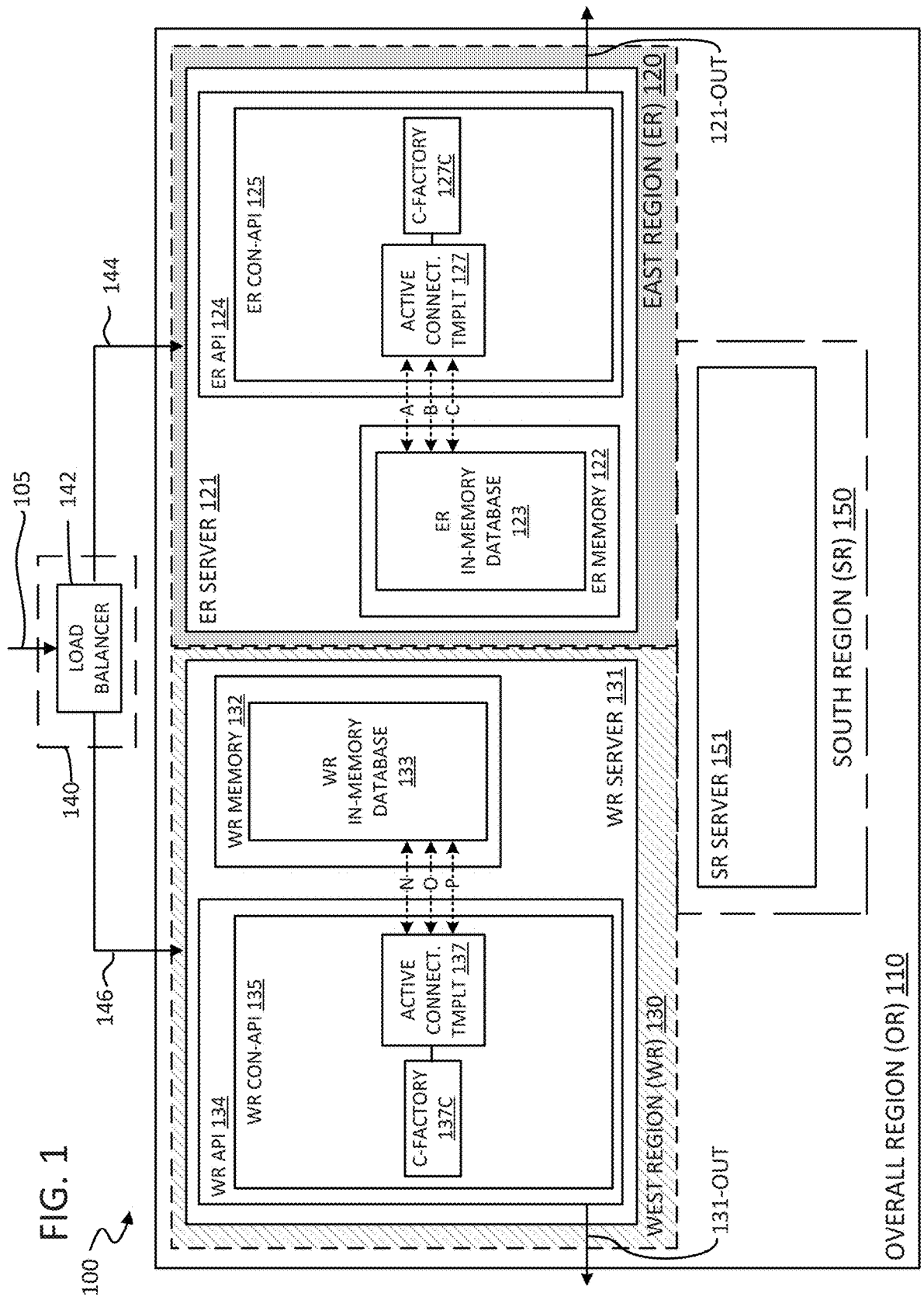
FIG. 1 illustrates a block diagram example of a multi-regional in-memory DB system.

In beginning descriptions, FIG. 1 illustrates a block diagram example of a multi-regional in-memory DB system 100. More particularly, illustrated within an overall region 110 (e.g., global; continent; country; state; city; county; district; neighborhood; etc.) are an east region (ER) 120, a west region (WR) 130 and a south region (SR) 150. Embodiments described ahead will focus mainly on description of two-region embodiments (i.e., ER and WR) for the sake of simplicity and brevity. However, the practice of embodiments is in no way limited to two-region embodiments.

Implemented within the ER 120 is an ER server 121 arrangement including an ER memory 122 having an ER (also known as (AKA), first; primary; master) in-memory DB 123. An in-memory DB (or IMDB) is a database management system which is stored and accessed within main memory (e.g., RAM, ROM). IMDB may alternatively be called a main memory database system (MMDB) or memory resident database (MRD). An IMDB contrasts with in-disk database management systems in that in memory DBs are faster than in disk DBs because disk access is slower than memory access, the internal optimization algorithms are simpler and execute fewer CPU instructions. Accessing data in memory eliminates seek time when querying the data, which provides faster and more predictable performance than disk The ER in-memory DB 123 is writeable/readable via an ER application programming interface (API) 124 including, for example, an ER connection application programming interface (CON-API) 125 for handling connection operations. The ER API 124 and ER CON-API 125 may each be a set of subroutine definitions, communication protocols, and tools, and configured to effect read/write software for accessing the ER in-memory DB 123.

Access from the ER CON-API 125 to the ER in-memory DB 123 is via the use of any assignable connection (described ahead) which may be any type of hardwired, wireless, optical, etc. path(s), or combination thereof. The ER CON-API 125 is further configured to provide outputs (e.g., read data) via an output connection 121-OUT which may be any type of hardwired, wireless, optical, etc. path(s), or combination thereof.

The FIG. 1 WR 130, WR server 131, WR output 131-OUT, WR memory 132, WR in-memory DB133, WR API 134, WR CON-API 135, are similar in construction and operation to ER 120, ER server 121, ER output 121-OUT, ER memory 122, ER in-memory DB123, ER API 124, ER CON-API 125, respectively. Accordingly, redundant detailed description thereof is omitted for the sake of simplicity and brevity.

The ER server 121 and WR server 131 are each set to be operated in an active mode meaning that each server is set operable to satisfy real-time or near-real-time get or read requests from clients as well as real-time or near-real-time post or write requests from clients. In contrast, being set to a passive mode would mean that the server is set not operable to satisfy real-time or near-real-time get or read requests from clients as well as real-time or near-real-time post or write requests from clients, or at best, is set operable to post or write a journal entry and/or a redundant copy, of post or write requests completed in a differing region and/or differing in-memory DB.

As to paths for communication between an in-memory DB and CON-API, a connection pool of predefined connections may be provided (in advance of receipt of an access request) to be useable for satisfying DB access requests. In some example embodiments (FIG. 1, for example), three predefined ER connections A, B, C may be provided between the ER in-memory DB 123 and the ER API 124, and three predefined WR connections N, O, P may be provided between the WR in-memory DB 133 and the WR CON-API 134. In one embodiment, such connections may be any type of hardwired, wireless, optical, etc. path(s), or combination thereof. Further, although three predefined connections are illustrated and described for simplicity and brevity, the practice of embodiments are not limited to having only three predefined connections. For example, in some embodiments, there may be only two predefined connections, and in some embodiments, there may be more than three (e.g., tens, hundreds, thousands of) predefined connections.

In some embodiments, the ER CON-API 125 (serving as a connection manager) may include an ER ACTIVE CONNECT. TMPLT 127 configured as an active connection template, and a C-FACTORY 127C configured as an active connection factory. In some embodiments, ER connection pool connections A, B, C may be provided between the ER in-memory DB 123 and the ER CON-API 125. Further, in some embodiments, each of the connections A, B, C are bi-directional meaning that data may travel in both directions thereon, i.e., from a first end of the connection to a second end, and vice versa.

The ER ACTIVE CONNECT. TMPLT 127 holds the ER connection pool connections A, B, C, whereas the C-FACTORY 127C determines which of the connections A, B, C should be assigned to which particular incoming access request. Assignment determinations may be carried out according to any predetermined algorithm, for example: in a round-robin fashion; assigning the connections in usage order (e.g., the least-most used connection being assigned first); in a random or pseudo-random order; etc.

Once the C-FACTORY 127C determines which of the connections A, B or C should be assigned to a particular incoming access request, the ER ACTIVE CONNECT. TMPLT 127 manages to pair the connection up with the request during a handling of the incoming access request. The assigned connection (i.e., A, B or C) may, in some embodiments, be flagged as "assigned" or "reserved" during the handling, so that the connection is not prematurely re-assigned to another access request, so as to avoid an assignment conflict, conflicting data on the connection, and/or conflicting operations. Once a handling of the incoming access request has been completed, the "assigned" or "reserved" flag of the connection (i.e., A, B or C) may be "released" so as to again become an assignable connection of the connection pool.

The FIG. 1's WR CON-API 135, WR ACTIVE CONNECT. TMPLT 137, WR C-FACTORY 137C and WR connection pool connections N, O, P, are similar in construction and operation to the FIG. 1 ER CON-API 125, ER ACTIVE CONNECT. TMPLT 127, ER C-FACTORY 127C and ER connection pool connections A, B, C, respectively. Accordingly, redundant detailed description thereof is omitted for the sake of simplicity and brevity.

As mentioned previously, advance provisioning of a connection pool so as to have immediately-available connections improves a speed in answering DB access requests (e.g., post or write requests; get or read requests). Again, advance provisioning is advantageous in that a setup-time-penalty for initially setting up each connection within the pool is performed in advance, before receiving access requests, such that a time for conducting each subsequent access request is shortened in that the access operation for an access request does not have to include the initial setup-time-penalty. Still further, since the predefined connections are recycled back into the connection pool after completing an access request, the initial setup-time-penalty for setting up each connection is only incurred once in a life of the connection, the life of the connection extending across handling many sequential access requests.

Further shown in FIG. 1 is another server 140 which includes a load balancer 142. Alternatively, the load balancer 142 may be included within any other server described with respect to FIG. 1, e.g., the ER server 121, WR server 131 or SR server 150. The load balancer 142 is configured to receive data access requests 105 (e.g., post or write requests; get or read requests), and then direct each access request to one of the ER server 121 arrangement or the WR server 131 arrangement via path 144 or 146, respectively.

That is, the load balancer 142 will direct requests according to some type of predetermined balancing arrangement, e.g.: alternating requests back-and-forth between ER and WR server arrangements; monitoring real-time loads of the ER and WR server arrangements and directing an incoming request to a server having a lesser load than the other server; monitoring traffic/delay across a network providing paths 144 and 146, and directing an incoming request to a region having less traffic/delay than the other region. The paths 144 and 146 may each be any type of hardwired, wireless, optical, etc. path(s), or combination thereof.

The ER server 12*l* and WR server 131 arrangements may further include some type of capability to ensure that a copy of data posted or written to the ER in-memory DB 123 was eventually posted or written and made available within all other in-memory DBs, e.g., within the WR in-memory DB 133. Likewise, the ER server 121 and WR server 131 arrangements would further include some type of capability to ensure that a copy of data posted or written to any other in-memory DB (e.g., the WR in-memory DB 123) was eventually available within all other in-memory DBs, e.g., within the ER in-memory DB 123.

As mentioned previously, while the above descriptions focus on details of in-memory DB arrangements of only two regions (i.e., ER and WR), the practice of embodiments is by no means limited to only two regions. For example, in practice, the arrangement of a third region (or even more) may be provided as illustrated generally by FIG. 1's illustrated SR 150 and SR server 151. Similar details may be illustrated, and similar descriptions may be made, with respect to the SR 150 and SR server 151 as were set forth with respect to the ER 120, ER Server 121, respectively. However, such detailed illustrations and descriptions are omitted for the sake of simplicity and brevity.

Figure 2:
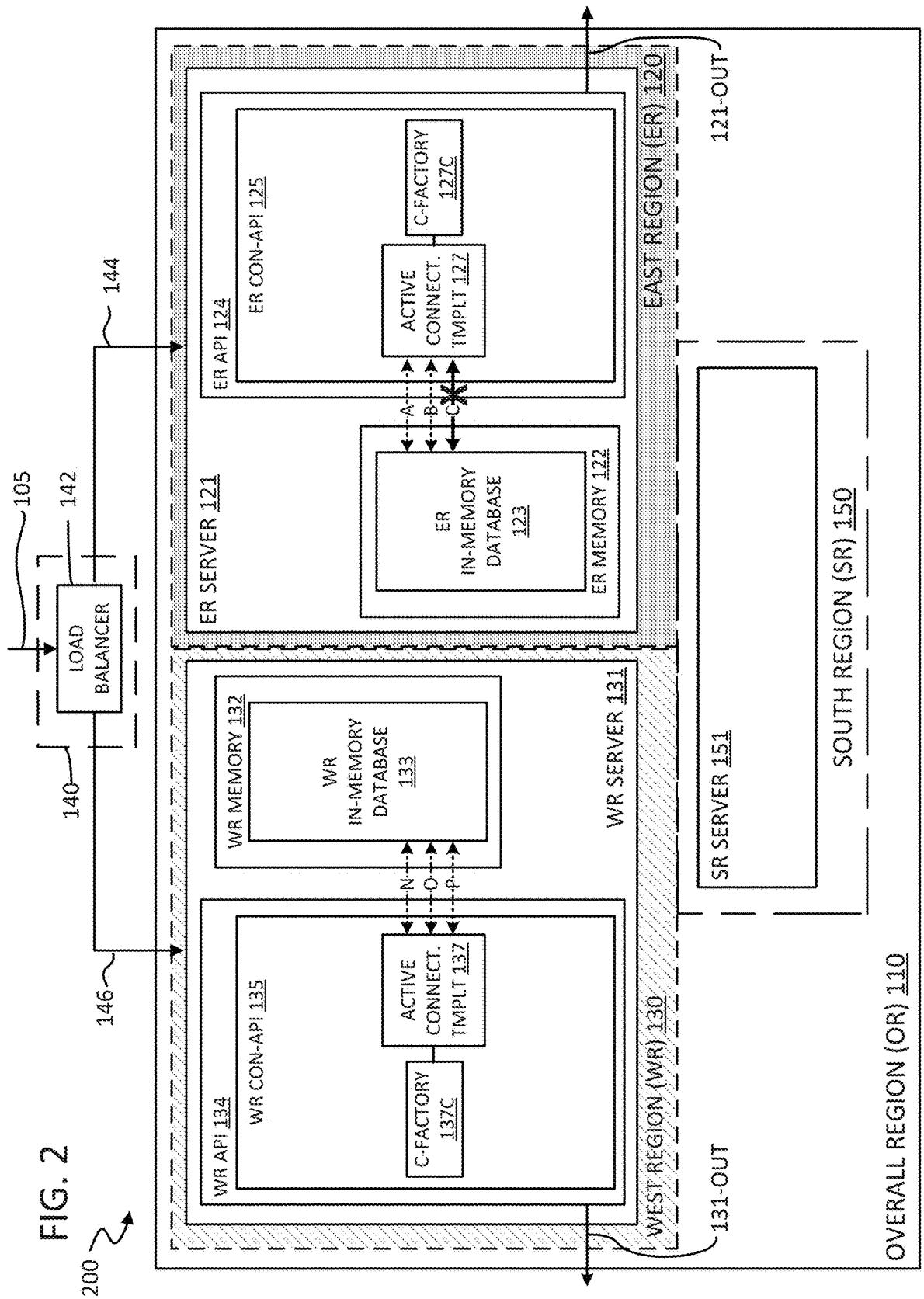
FIG. 2 illustrates a block diagram example of another multi-regional in-memory DB system having at least one predefined connection rendered invalid within a connection pool.

FIG. 2 illustrates a block diagram example of another multi-regional in-memory DB system 200 which is similar in construction and operation to FIG. 1's system 100, but having at least one predefined connection rendered invalid within a connection pool. More particularly, as an illustrative example, predefined connection C is illustrated as being invalid, invalidity being shown representatively via the use of a bolded "X" drawn through FIG. 2's C connection.

Regarding the ability to self-detect and/or self-cure, while it may be possible to poll or test each of the individual pool connections A, B, C to find and eliminate or avoid (e.g., quarantine) an invalid connection, it may be impractical to do so in that there may be hundreds or even thousands of pool connections within a connection pool. That is, given that the in-memory DB may be on-line 24 hours a day satisfying hundreds of thousands (if not millions) of access requests, the polling or testing of each of the individual pool connections while on-line might require excessive testing time and/or bandwidth which might interfere with the normal access request services provided via the in-memory DB.

Accordingly, this FIG. 2 embodiment has no special provisioning to self-detect or self-heal when one or more connection experiences an incidence of invalidity, and instead, is configured (i.e., constructed, arranged or programmed) to simply live with any invalid connection (e.g., the invalid C connection) which occurs. More particularly, in some embodiments, the invalid connection continues to exist within the connection pool, and over time, is occasionally assigned (e.g., lent) for use in attempting access to the subject DB to satisfy an individual incoming access request (e.g., to post or write data into the DB, or to get or read data from the DB).

However, given that the connection is invalid, a failure to connect will be experienced (e.g., upon expiration of a failed-to-connect time-out period), and the invalid connection will be released back into the pool, and a new connection will be assigned (according to an existing assignment algorithm). Such represents an inefficiency which adds to the time incurred to satisfy the individual access request and adds to an increase in an average time for the pool to satisfy access requests.

In some embodiments, it may be possible that the invalid connection gets temporarily assigned multiple sequential times in the attempt to satisfy same individual access request. One example might be an embodiment where a random connection is assigned out of the connection pool to satisfy an access request, and sequential, random selections inadvertently keep selecting an invalid connection multiple sequential times (e.g., twice in a row). In such embodiments, the added-time inefficiency would be compounded by the multiple sequential assignments of invalid connections to satisfy the same access request.

Further, as mentioned previously, the greater the number of pool connections which become invalid within a pool, the greater the inefficiency in using that pool of pool connections to access the subject DB. As a direr situation, if all the connections within a pool become invalid, then the DB may become inaccessible using the pool connections. Accordingly, although the FIG. 2 embodiment may be argued to be somewhat workable, it may not be practicable or recommended.

Figure 3:
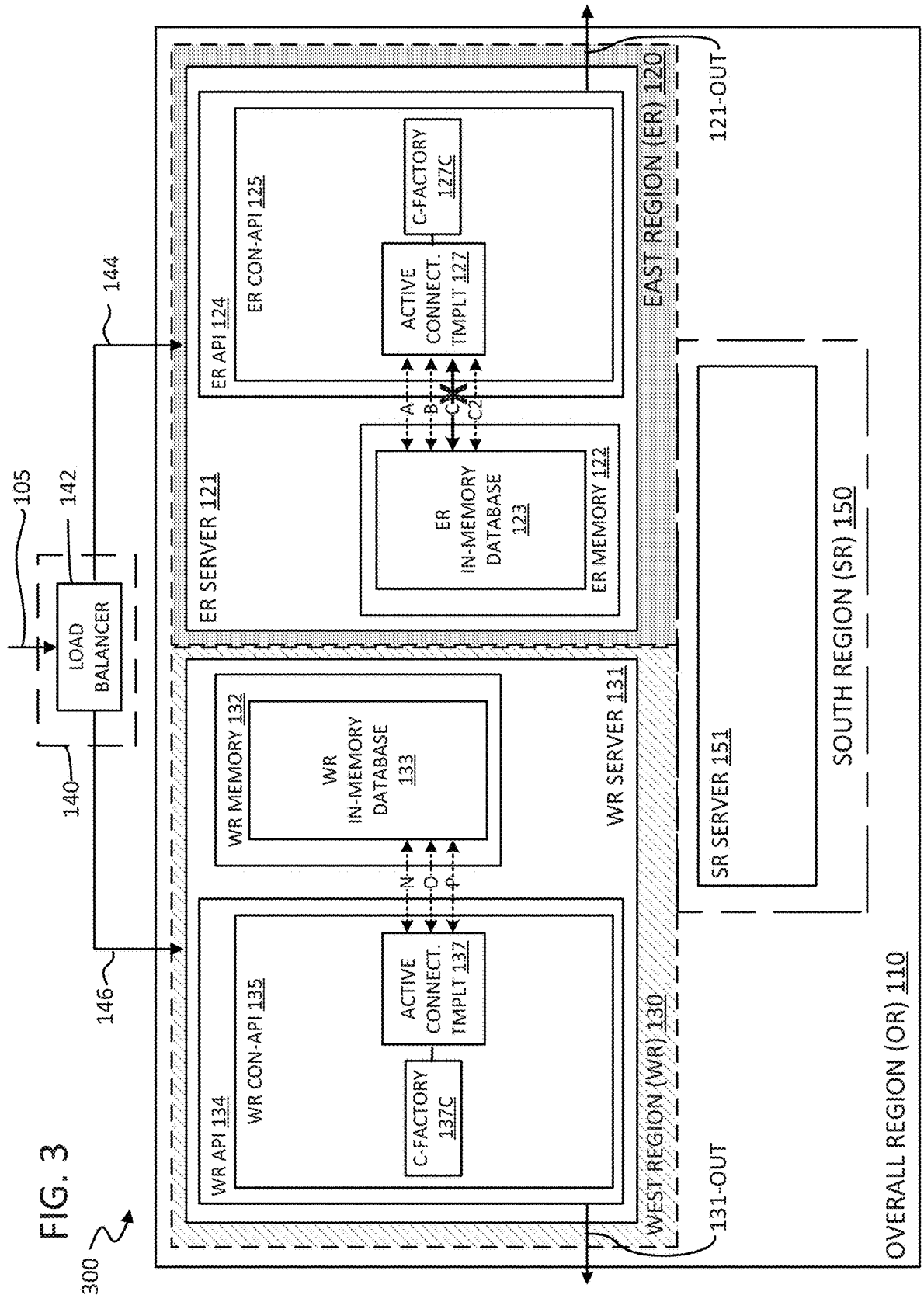
FIG. 3 illustrates a block diagram example of another multi-regional in-memory DB system having at least one predefined replacement connection within a connection pool.

FIG. 3 illustrates a block diagram example of another multi-regional in-memory DB system 300 having at least one predefined replacement connection within a connection pool. More particularly, FIG. 3's embodiment is similar in construction and operation to FIG. 2's, but the FIG. 3 embodiment is configured (i.e., constructed, arranged or programmed) to add one or more additional connection to the active connection pool responsive to experiencing an invalid connection (e.g., connection C). That is, one or more additional connection is added in an attempt to compensate for the invalid connection.

For the sake of simplicity and brevity, FIG. 3 shows only a single additional connection C2 added into the active connection pool A, B, C, and accordingly, the pool becomes active connection pool A, B, C, C2. However, the practice of this embodiment is by no means limited to the addition of only a single connection, i.e., plural connections may be added.

Further, practice of this embodiment might invoke the adding of additional connection(s) responsive to many differing possible triggers, e.g., adding one or more connection responsive to: a single pool connection experiencing an invalid state; a predetermined plurality of pool connections each experiencing an invalid state; a measured efficiency of the connection pool falling below a predefined level; a measured response time for satisfying access requests via the connection pool rising above a predefined level; etc.

The adding and managing of one or more additional connection within the connection pool, of course, would require corresponding adjustment to the ER CON-API 125, C-FACTORY 127C and/or ER ACTIVE CONNECT TMPLT 127. For example, the ER ACTIVE CONNECT TMPLT 127 would have to be adjusted to hold ER connection pool connections A, B, C, C2 instead of connections A, B, C. As another example, the C-FACTORY 127C would have to determine which of the connections A, B, C, C2 (instead of connections A, B, C) should be assigned to which particular incoming access request.

While the FIG. 3 embodiment does provide some improvement over the FIG. 2 embodiment, disadvantages still exist in that: the invalid connection C still exists within the connection pool; there is no mechanism to self-detect and eliminate invalid connections, and the time taken to configure and add one or more connection to the pool may add a time penalty to an individual access request and/or an average access time of the connection pool.

Figure 4:
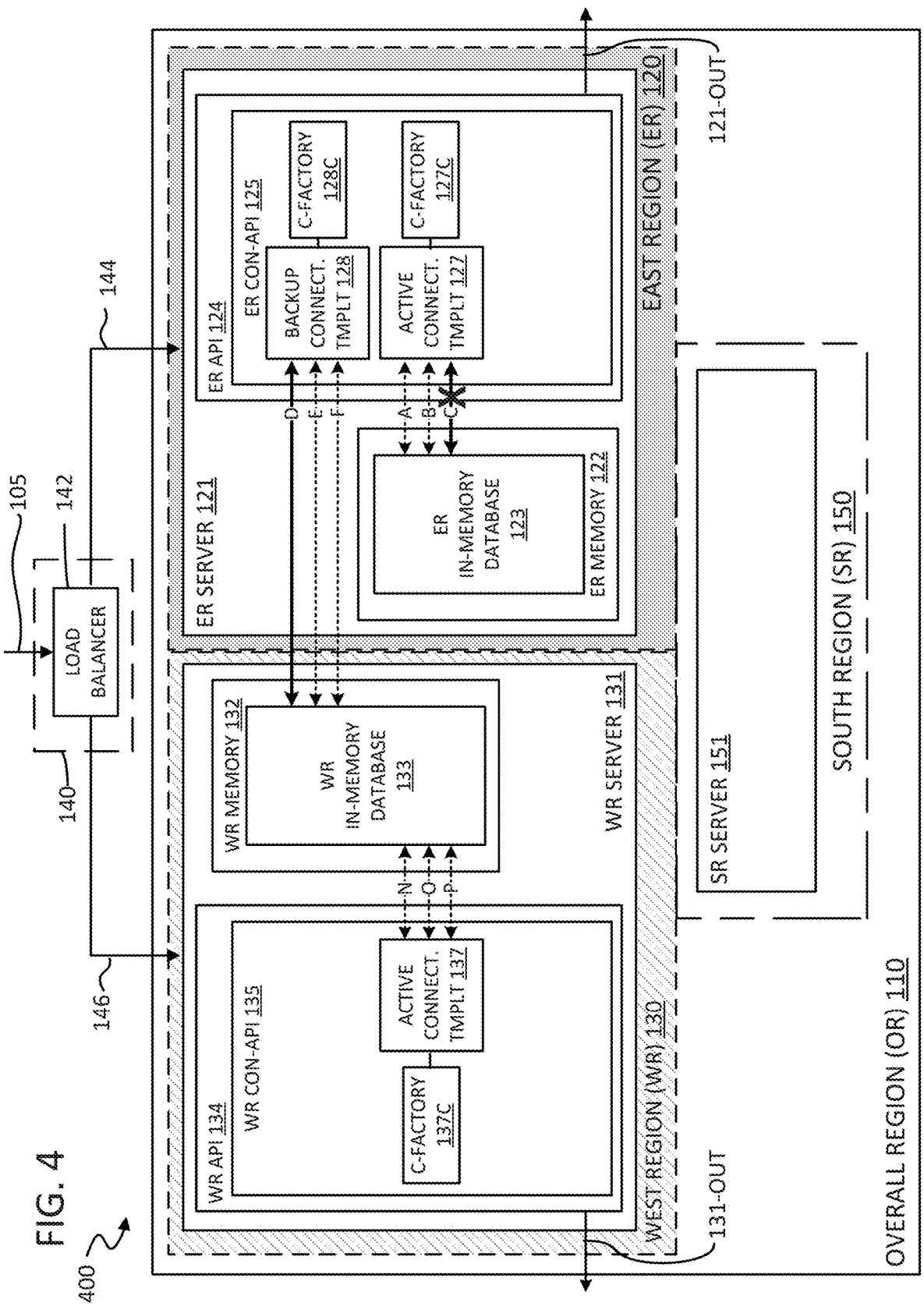
FIG. 4 illustrates a block diagram example of another multi-regional in-memory DB system having at least one backup connection pool.

FIG. 4 illustrates a block diagram example of another multi-regional in-memory DB system 400 having at least one backup connection pool. More particularly, FIG. 4's embodiment is similar in construction and operation to FIG. 2's, but the FIG. 4 embodiment is configured (i.e., constructed, arranged or programmed) to add one or more backup connection pool system, in an attempt to compensate for invalid connections which might be experienced. For the sake of simplicity and brevity, FIG. 4 shows only a single additional backup connection pool system, although the practice of embodiments is not limited thereto.

The use of the phrase "backup" throughout this disclosure means a component or arrangement performs (i.e., takes over) an operation (e.g., an access request) in lieu of a component or arrangement which was originally tasked with performing the operation. More particularly, because the original component experiences a predetermined level of inefficiency, or is no longer able to complete an operation, a differing component or arrangement is instead tasked with continuing operations onward in an attempt to complete the operation.

Describing further, the ER CON-API 125 (serving as a connection manager) may further include ER BACKUP CONNECT. TMPLT 128 serving as a backup connection template, and C-FACTORY 128C serving as a backup connection factory. In some embodiments, backup connection pool connections D, E, F are configured for connection from the ER backup components to a differing remote in-memory DB rather than the local ER in-memory DB. For example, backup pool connections D, E, F, may provide a connection between the remote WR in-memory DB 133 and the ER API 124. In some embodiments, each of the connections D, E, F are bi-directional meaning that data may travel in both directions thereon, i.e., from a first end of the connection to a second end, and vice versa.

In one embodiment, such connections may be any type of hardwired, wireless, optical, etc. path(s), or combination thereof. Further, although three predefined connections are illustrated and described for simplicity and brevity, the practice of embodiments are not limited to having only three predefined connections. For example, in some embodiments there may be only two predefined connections, and in some embodiments, there may be more than three (e.g., tens, hundreds, thousands of) predefined connections.

The ER BACKUP CONNECT. TMPLT 128 holds the ER connection pool connections D, E, F, whereas the C-FACTORY 128C determines which of the connections D, E, F, should be assigned to which particular incoming access request. Assignment determinations may be carried out according any predetermined algorithm, for example: in a round-robin fashion; assigning the connections in usage order (e.g., the least-most used connection being assigned first); in a random or pseudo-random order; etc.

Once the backup C-FACTORY 128C determines which of the connections D, E, F should be assigned to a particular incoming access request, the ER BACKUP CONNECT. TMPLT 128 handles the actual management of pairing the connection up with the request during a handling of the incoming access request. The assigned connection (i.e., D, E or F) may, in some embodiments, be flagged as "assigned" or reserved during the handling, so that the connection is not prematurely re-assigned to another access request, so as to avoid an assignment conflict, conflicting data on the connection, and/or conflicting operations. Once a handling of the incoming access request has been completed, the "assigned" or reserved flag of the connection (i.e., D, E or F) may be "released" so as to again become an assignable connection of the backup connection pool.

In a manner similar to what was previously mentioned, advance provisioning of a backup connection components (e.g., backup connection pool (e.g., D, E, F); ER BACKUP CONNECT. TMPLT 128; backup C FACTORY 128C) ahead of access requests, improves a speed in answering DB access requests (e.g., post or write requests; get or read requests). Again, advance provisioning is advantageous in that a setup-time penalty for initially setting up each backup connection component is performed in advance, such that a time for conducting each subsequent access request is shortened in that the access operation for an access request does not have to include the initial setup time penalty. Still further, since the predefined backup connections are recycled back into the backup connection pool after completing an access request, the initial setup-time penalty for setting up each backup connection is only incurred once per connection while the connection itself is then used to satisfy multiple access requests.

The FIG. 1's ER BACKUP CONNECT. TMPLT 128, ER C-FACTORY 128C and ER connection pool connections D, E, F are similar in construction and operation to the FIG. 1 ER ACTIVE CONNECT. TMPLT 127, ER C-FACTORY 127C and ER connection pool connections A, B, C, respectively. Accordingly, redundant detailed description thereof is omitted for the sake of simplicity and brevity. Only differences therebetween will be described as follows.

More particularly, whereas the active connection components (e.g., ER ACTIVE CONNECT. TMPLT 127, ER C-FACTORY 127C and ER connection pool connections A, B, C) receive and attempt to handle incoming access requests directly from the load balancer 142 via path 144, in some embodiments, the backup connection components (e.g., ER BACKUP CONNECT. TMPLT 128, ER C-FACTORY 128C and ER connection pool connections D, E, F) receive and attempt to handle only backup access requests indicated by (e.g., delegated from) the active connection components. That is, an active connection pool may ask the backup connection components for backup assistance in satisfying an individual access request in certain situations and at certain timings.

More particularly, in some embodiments, upon the active connection components' recognizing an expiration of a failed-to-connect time-out period (and thus invalid connection within its connection pool), the active connection components may then ask the backup connection components for backup assistance in satisfying an individual access request. Such embodiments may be disadvantageous in that waiting the entire failed-to-connect time-out period, would add a time penalty to the time taken to satisfy the access request.

In other embodiments, the active connection components may maintain a list of the invalid connections within its connection pool, and then, upon an immediate comparison showing that a newly-assigned connection is an invalid connection, immediately ask the backup connection components for backup assistance. Such embodiments are advantageous in that backup assistance is requested more quickly, thereby lessening or possibly avoiding any time penalty added to the time taken to satisfy the access request.

The FIG. 4 embodiment (and other backup embodiments described ahead) are disadvantageous in that asking the remote WR in-memory DB 133 to satisfy the request which should have been handled by the local ER in-memory DB 123, represents an increased burden on the remote WR in-memory DB 133, and care might have to be taken to monitor a number of real-time access requests being handled at any given time by the remote WR in-memory DB 133, so as to avoid over-burdening of the remote WR in-memory DB 133.

Figure 5:
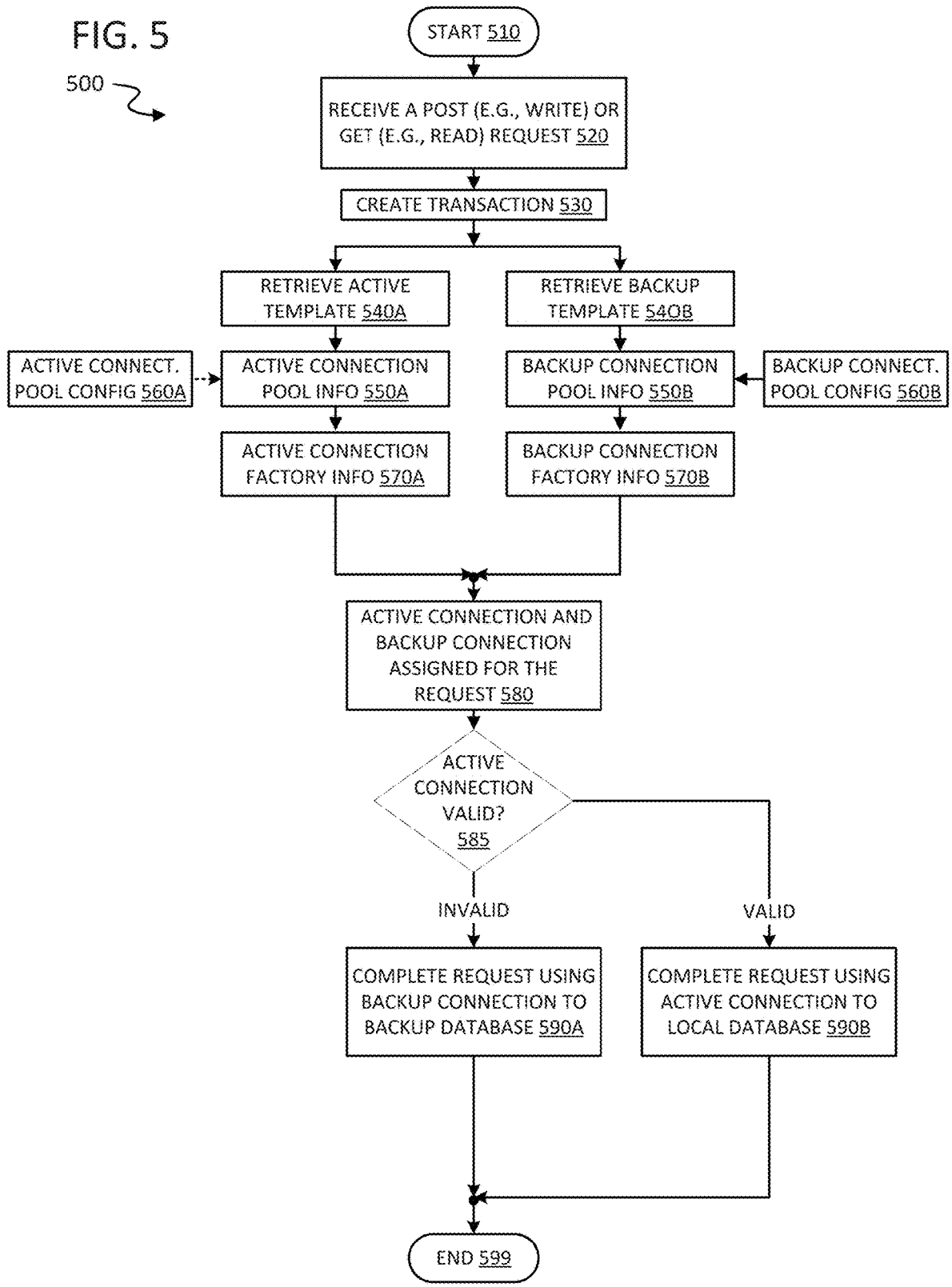
FIG. 5 illustrates an example flow chart algorithm regarding FIG. 4's use of a backup connection within a backup connection pool, in place of an invalid connection of an active connection pool.

Next, FIG. 5 illustrates an example flow chart algorithm 500 regarding FIG. 4's use of a backup connection within a backup connection pool, in place of an invalid connection of an active connection pool. After start 510, the ER Server 121 receives an access request (e.g., post or write request; get or read request) from the load balancer 142 via path 144 (operation 520), and creates a transaction (operation 530). Responsive thereto, the ER Server 121, ER API 124, and/or ER CON-API 125 perform two series of operations conducted in parallel.

More particularly, as a first series (FIG. 5's upper left-hand branch), there is: retrieval of an active template (operation 540A); retrieval of active connection pool information (operation 550A) including retrieval of an active connection pool configuration (operation 560A); and, retrieval of active connection factory information (operation 570A). Similarly, as a second series (FIG. 5's upper right-hand branch), there is: retrieval of a backup template (operation 540B); retrieval of backup connection pool information (operation 550B) including retrieval of a backup connection pool configuration (operation 560B); and, retrieval of backup connection factory information (operation 570B).

Utilizing the retrieved information, assignment of an active connection and a backup connection are obtained for the access request transaction (operation 580). In some embodiments, the ER C-FACTORY 127C determines assignment of the active connection and the ER C-FACTORY 128C determines assignment of the backup connection. Example selected connections C (selected from active connection pool A, B, C) and D (selected from the backup connection pool D, E, F) are shown representatively in FIG. 4 via illustration with solid connection lines as opposed to dashed connection lines.

Next, in FIG. 5's operation 585, it is determined whether the active connection is valid or not. As mentioned previously, in some example embodiments, such determination might be obtained by maintaining a list of the invalid connections concerning its connection pool (e.g., connection pool A, B, C), and comparing the newly-assigned active connection to the list for invalidity.

If the newly-assigned active connection is determined to be valid, the transaction (i.e., access request) is completed (operation 590B) using the active connection to the local DB (e.g., local ER in-memory DB 123). In contrast, if the newly-assigned active connection is determined to be invalid, the transaction is completed (operation 590A) using the backup connection to the remote backup DB (e.g., the remote WR in-memory DB 133). Upon completion of either of operation 590A or B, the FIG. 5 flow ends (operation 599).

Because active and backup connections are obtained in parallel (via FIG. 5 operation 580) and because the comparison of the assigned active connection to an invalid connection list is checked (operation 585), backup connection components may ask for backup assistance with minimal delay. Such embodiments are advantageous in that backup assistance is requested more quickly (e.g., in comparison to waiting for the expiration of a failed-to-connect time-out period), thereby lessening or possibly even avoiding any time penalty added to the time taken to satisfy the access request.

Figure 6:
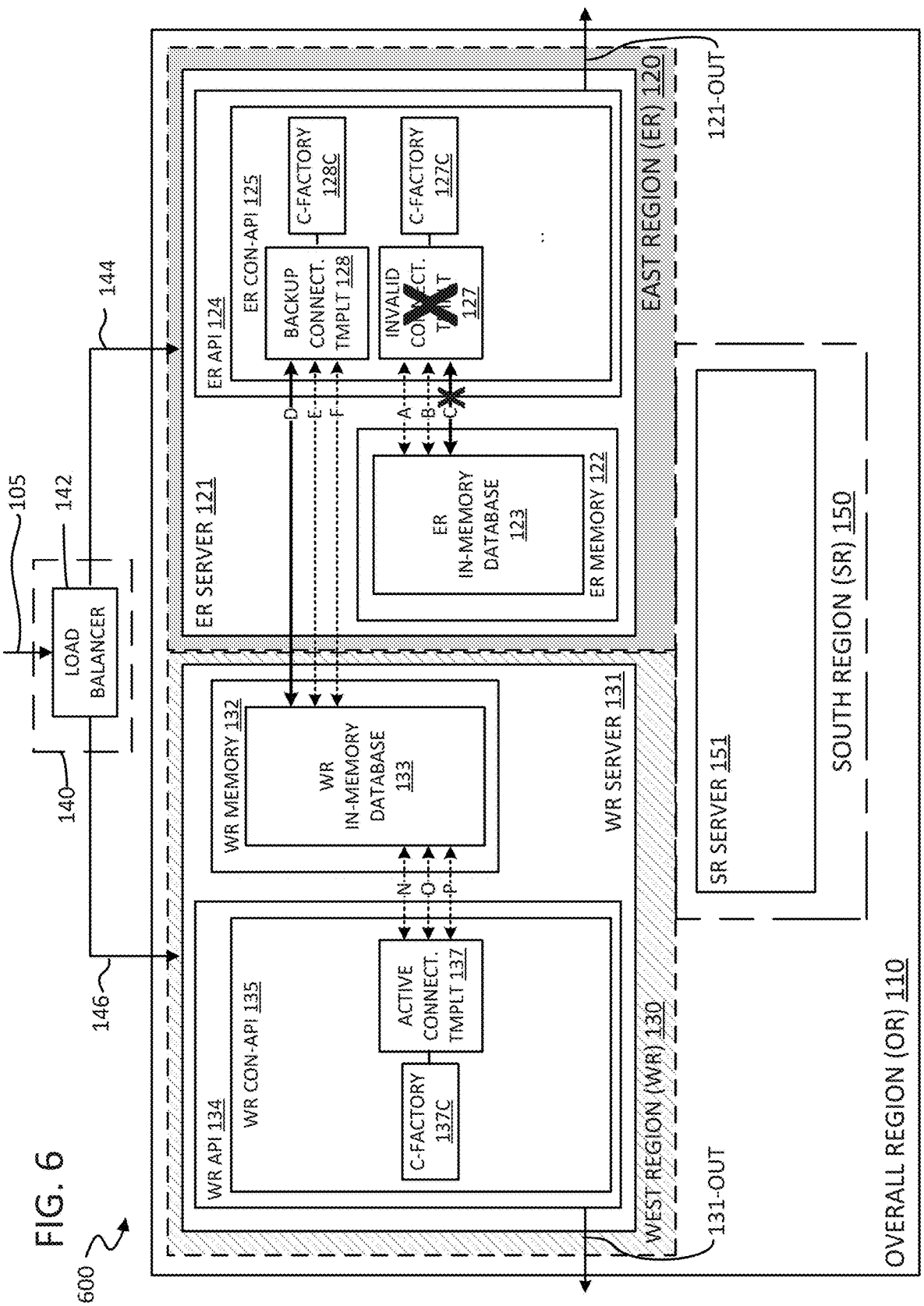
FIG. 6 illustrates a block diagram example of another multi-regional in-memory DB system having an active connection template rendered invalid, responsive to at least one predefined connection being rendered invalid within an active connection pool.

Next, FIGS. 6-9 illustrate aspects of an example embodiment which makes use of a backup connection within a backup connection pool, as well as creating and invoking replacement connection pool components responsive to invalid active connection pool components. More particularly, FIG. 6 illustrates a block diagram example of another multi-regional in-memory DB system 600, having an active connection template rendered invalid responsive to at least one predefined connection being rendered invalid within an active connection pool.

FIG. 6's embodiment is similar in construction and operation to FIG. 4's embodiment, but FIG. 6's embodiment is further configured (i.e., constructed, arranged or programmed) to invalidate the ER ACTIVE CONNECT. TMPLT 127 responsive to detection of a predetermined level of invalidity with respect to the connections of the connection pool A, B, C. Invalidity of the ER ACTIVE CONNECT. TMPLT 127 is shown representatively within FIG. 6 via the use of a bolded "X" drawn through the template 127.

In some embodiments, template invalidity is triggered in response to a single connection (e.g., connection C) of the connection pool A, B, C being determined as invalid. In some other embodiments, template invalidity is triggered in response to a predetermined plurality of connections of the connection pool being determined as invalid. For example, two connections or more, five connections, ten connections, etc. In still other embodiments, template invalidity is triggered in response to a predetermined percentage of connections of the connection pool being determined as invalid. For example, ten percent, twenty percent, one-third, one-fourth, one-half, etc.

Once a template is decided to be invalid, the actual invalidating of the template may, in some embodiments, be immediate. In some other embodiments, the actual invalidating may be delayed. As one consideration, time may be needed to complete already-invoked template operations, such as allowing transactions which are currently using valid pool connections (e.g., connection A and/or connection B) to complete. As another consideration, time may be needed to allow the active connection components (e.g., ER ACTIVE CONNECT. TMPLT 127, ER C-FACTORY 127C) to invoke further operations, such as asking the backup connection components for backup assistance in satisfying an individual access request. In some embodiments, the template may be allowed to continue operations excepting for managing further-assigned connections within its connection pool (e.g., connection pool A, B, C).

In some embodiments, the active connection factory (e.g., C-FACTORY 127C) may also be invalidated similarly to the invalidation of the active connection template (e.g., ER ACTIVE CONNECT. TMPLT 127). Invalidation of the active connection factory might be advantageous in that there would be a stoppage of the active connection factory's further determination of which of the connections A, B, C should be assigned to which particular incoming access request. Subsequent determinations may be resumed and conducted later by a replacement connection factory as discussed ahead.

Figure 7:
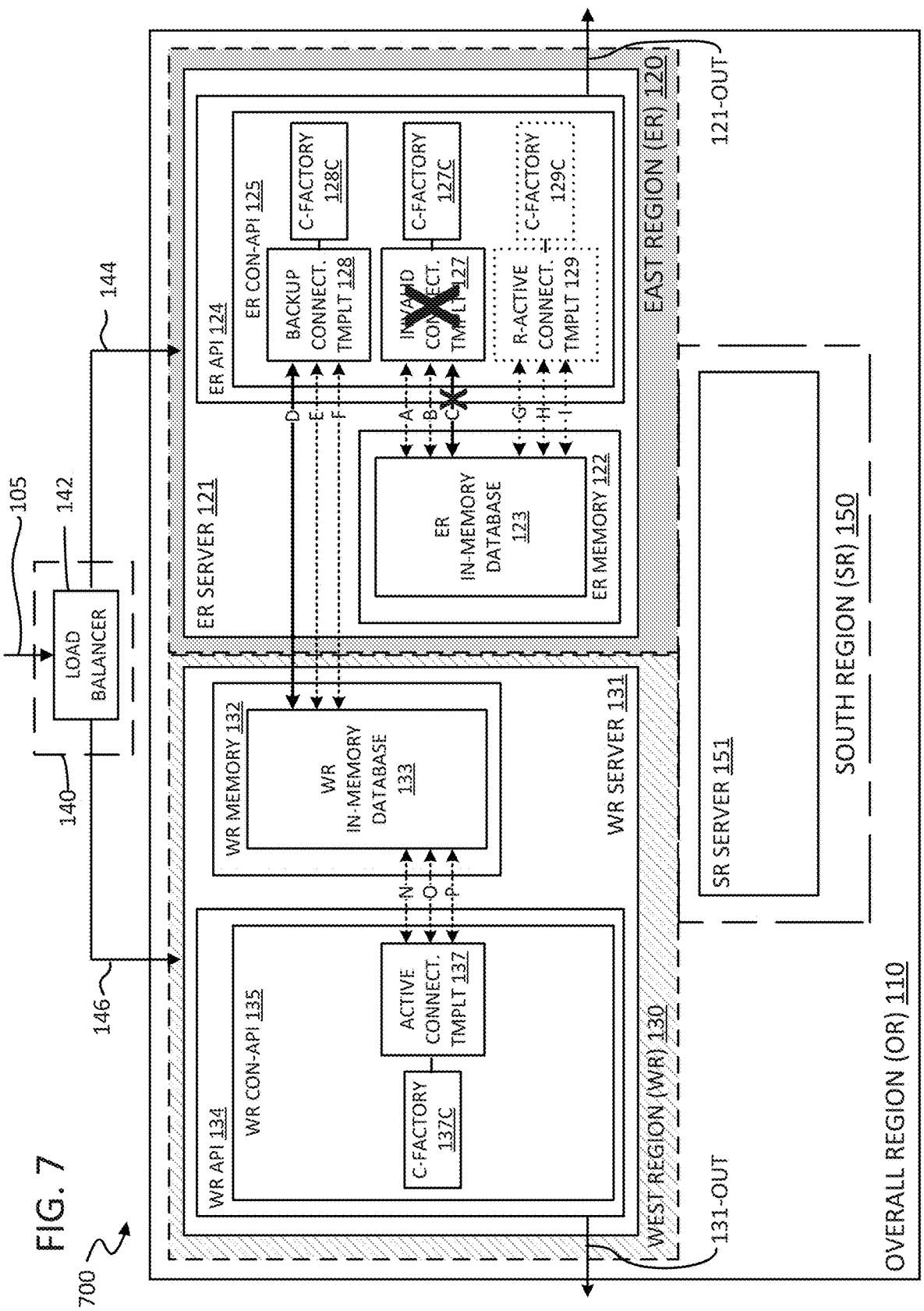
FIG. 7 illustrates a block diagram example of the FIG. 6 multi-regional in-memory DB system further having replacement connection pool components created responsive to at least one predefined connection and the active connection template being rendered invalid within a connection pool.
Figure 8:
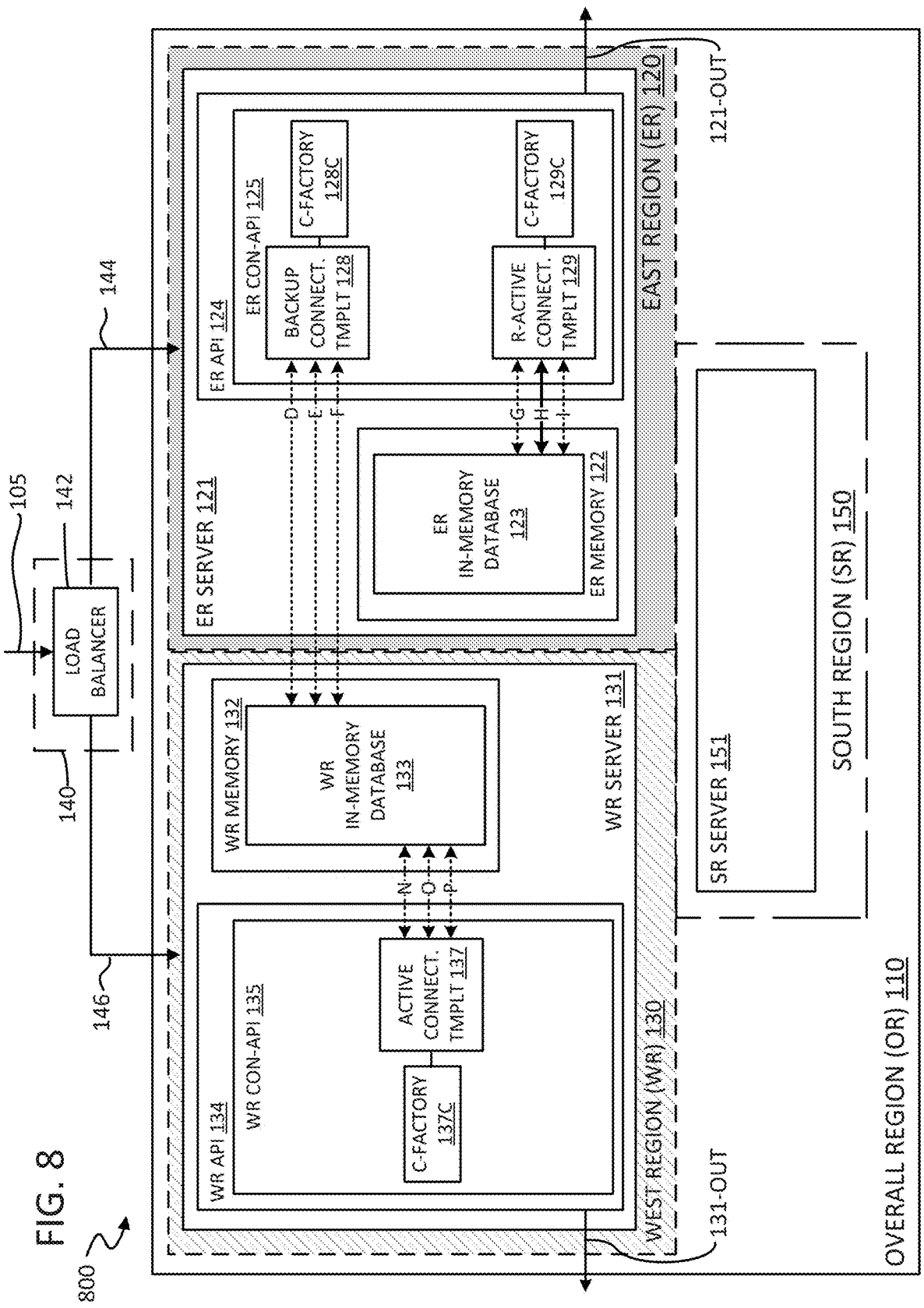
FIG. 8 illustrates a block diagram example of the FIG. 7 multi-regional in-memory DB system further having the originally-active connection pool components released in favor of the replacement connection pool components taking over active connection services.
Figure 9:
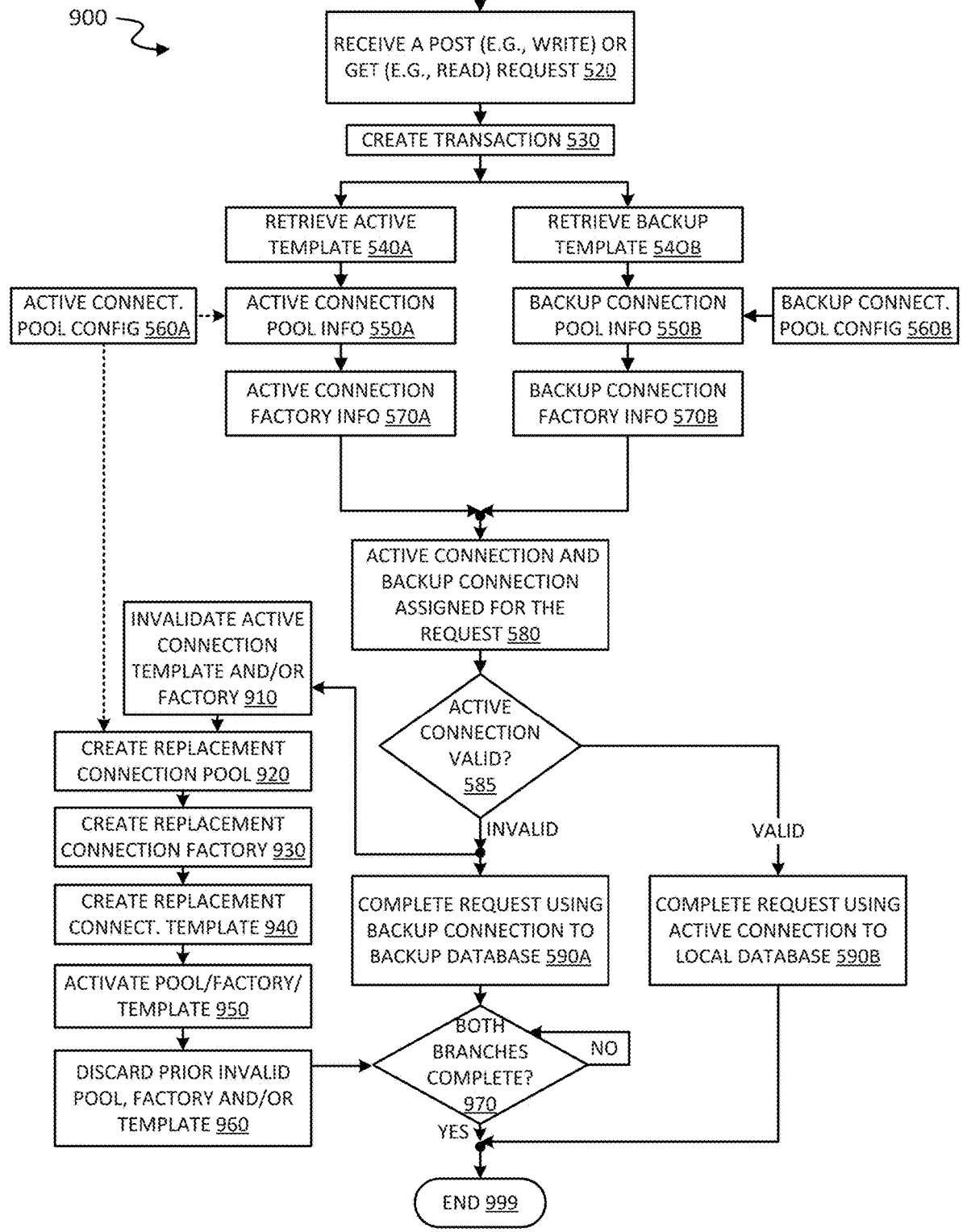
FIG. 9 illustrates an example flow chart algorithm regarding FIGS. 6-8's use of a backup connection within a backup connection pool, and replacement connection pool components being created and invoked, in place of an invalid connection components.

FIG. 9 illustrates an example flow chart algorithm 900 regarding FIGS. 6-8's making use of a backup connection within a backup connection pool, as well as creating and invoking replacement connection pool components responsive to invalid active connection pool components. Any FIG. 9's flow operations which are numbered the same as the previously-described FIG. 5's flow operations, operate similarly, and redundant description thereof is omitted for the sake of simplicity and brevity.

As differences from FIG. 5, the FIG. 9's INVALID branch is shown splitting such that an additional branch of operations is conducted in parallel to the operation 590A aimed at completing the access request using the backup connection (e.g., connection D) to the backup DB (e.g., WR in-memory DB133). In detailing the added branch, FIG. 9's operation 910 is illustrative of the invalidating of the active connection template (e.g., ER ACTIVE CONNECT. TMPLT 127) and/or active connection factory (e.g., ER C-FACTORY 127C). as was described above.

FIG. 9's added branch further shows operation 920 which creates a replacement connection pool; operation 930 which creates a replacement connection factory, and operation 940 which creates a replacement connection template. In some embodiments, creating a replacement connection template includes establishing and maintaining a new pointer pointing access to the replacement connection pool set.

Dotted lines used in FIG. 7 to draw the created components (i.e., replacement connection pool G, H, I; replacement connection factory ER C-FACTORY 129C; and replacement connection template ER R-ACTIVE CONNECT. TMPLT 129) represent such components as having been created but not yet activated. In further detail, FIG. 9's creation of a replacement connection pool (operation 920) may include retrieval of an active connection pool configuration (see FIG. 9 dashed vertical line extending from operation 560A block).

Next, FIG. 9's operation 950 further activates the replacement pool, factory, and template. Solid lines used in FIG. 8 to draw the created components represent such components as having been activated, and thus having taken over active connection component responsibilities/operations from the discarded previously-invalidated components.

Finally, FIG. 9's added branch continues with a discarding operation 960 to discard the prior invalid connection pool, factory and/or template. In some embodiments, discarding all the preconfigured connections in the invalid connection pool set is conducted via eliminating a pointer previously maintained (e.g., within the template) to point to the preconfigured connections.

In connection with discarding, FIG. 8 illustrates the absence of the previously-invalidated components (i.e., the ER ACTIVE CONNECT. TMPLT 127, ER C-FACTORY 127C and ER connection pool connections A, B, C), representing such components as having been removed. Removal is advantageous in that resources (e.g., connections; processing bandwidth; etc.) rendered unusable in their present form by invalidity, are released and recycled to make the resources available again within the system.

At FIG. 9's operation 970, it is determined whether both branches have completed operations. If not, such determination is repeated via looping (i.e., see "No" loop) until both branches have completed. Once the operation 970 determines that both branches have completed, or if operation 590B in the right-most branch is completed, the FIG. 9 flow moves to end operation 999.

Performing the branched operations 910-960 in parallel with operation 590A is advantageous in that a time taken to create and activate the replacement active components and discard the invalidated components, at least partially (and possibly fully) overlaps with a time needed to satisfy the access request using the backup connection to the backup DB. Accordingly, the replacement time would be at least partially (and possibly fully) hidden by the request-satisfying time.

To summarize, once sufficient connection pool invalidity triggers, the described FIGS. 6-9 embodiment performs three major tasks, i.e., immediately implements the arrangement of backup connection components and a remote in-memory DB to instead satisfy the subject access request; creates/activates replacement active connection components designated to satisfy subsequent access requests; and, discards previously-active (now invalidated) connection components to free up resources.

Once activated and on-line, the replacement active components (i.e., the ER R-ACTIVE CONNECT. TMPLT 129, ER C FACTORY 129C and ER connection pool connections G, H, I) would handle connections for subsequent access requests. As an illustrative example, connection H is shown representatively assigned within FIG. 8, via the connection H being illustrated with a solid connection line as opposed to a dashed connection line.

Figure 10:
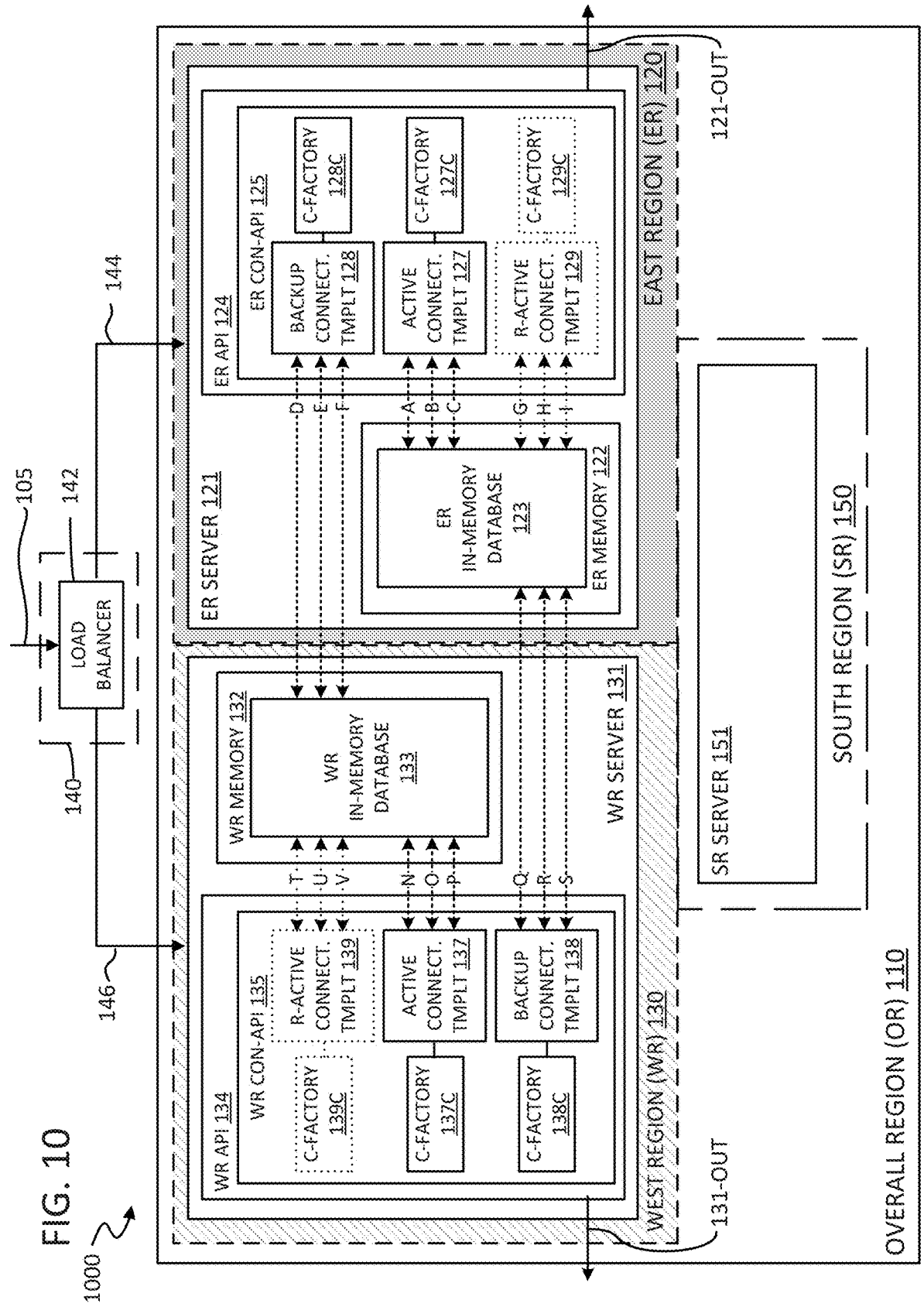
FIG. 10 illustrates a block diagram example showing the possibility of a separate active connection pool, active connection template, backup connection pool, backup connection template, replacement connection pool and replacement connection template, provided in each region of plural differing regions in an in-memory DB system.

Next, FIG. 10 illustrates a block diagram example showing the possibility of a separate active connection pool, active connection template, active connection factory, backup connection pool, backup connection template, backup connection factory, replacement connection pool, replacement connection template and replacement connection factory, provided in each region of plural differing regions in an in-memory DB system 1000. More particularly, the ER components were already as discussed above.

Similarly, the FIG. 10 WR may include a separate active connection pool N, O, P, active connection template WR ACTIVE CONNECT TMPLT 137, active connection factory WR C-FACTORY 137C, backup connection pool Q, R, S, backup connection template WR BACKUP CONNECT TMPLT 138, backup connection factory WR C-FACTORY 138C, replacement connection pool T, U, V, replacement connection template WR R-ACTIVE CONNECT. TMPLT 139 and replacement connection factory WR C-FACTORY 139C. Such WR components are similar in configuration and operation to the ER's active connection pool A. B. C, active connection template ER ACTIVE CONNECT TMPLT 127, active connection factory ER C FACTORY 127C, backup connection pool D, E, F, backup connection template ER BACKUP CONNECT TMPLT 128, backup connection factory ER C FACTORY 128C, replacement connection pool G, H, I, replacement connection template ER R-ACTIVE CONNECT. TMPLT 129 and replacement connection factory ER C FACTORY 129C, respectively, and accordingly, redundant description thereof is omitted for the sake of simplicity and brevity. Components drawn in dotted-line form within FIG. 10 are done so to representatively show that such components are not always necessarily present at all times, but instead, such are components which may be created and activated at times when active connection invalidity is encountered, and replacement rebuilding is conducted.

In short, the FIG. 10 WR arrangement is reciprocal to the FIG. 10 ER arrangement. That is, the WR's in-memory DB 133 is used to act as a backup DB to satisfy access requests which are temporarily not able to be completed within the ER owing to active connection invalidity and replacement active components rebuilding, and the ER's in-memory DB 123 is used to act as a backup DB to satisfy access requests which are temporarily not able to be completed within the WR owing to active connection invalidity and replacement active components rebuilding. Thus, not only does the FIG. 10 embodiment offer the advantages of having multi-regional DB arrangements, but also offers the advantage of inter-regional backup accesses during times when localized connection invalidity is encountered and repaired.

While the above descriptions focus on details of reciprocal in-memory DB arrangements of only two regions (i.e., ER and WR), the practice of embodiments is by no means limited to only two regions or to being reciprocal. For example, in some embodiment practices, the arrangement of a third region (or even more regions) may be provided as illustrated generally by FIG. 1's SR 150 and SR server 151. Similar details may be illustrated, and similar descriptions may be made, with respect to the SR 150 and SR server 151 as were set forth with respect to the ER 120, ER Server 121, respectively. However, such detailed illustrations and descriptions are omitted for the sake of simplicity and brevity.

In some embodiments, the arrangement of a backup DB may not be reciprocal, and instead, may be arranged non-reciprocally. More particularly, as one non-limiting example, three or more regional DB arrangements may provide backup DB availability to others in a ring-like arrangement. More specifically, as one example: the WR's in-memory DB may be used to act as a backup DB to satisfy ER access requests which are temporarily not able to be completed within the ER owing to ER active connection invalidity and replacement active components rebuilding; the SR's in-memory DB may be used to act as a backup DB to satisfy WR access requests which are temporarily not able to be completed within the WR owing to WR active connection invalidity and replacement active components rebuilding; and, the ER's in-memory DB may be used to act as a backup DB to satisfy SR access requests which are temporarily not able to be completed within the SR owing to SR active connection invalidity and replacement active components rebuilding.

In other embodiments, the backup DB's do not necessarily have to be arranged in a ring-like arrangement, but instead, it may be sufficient where each regional DB arrangement has at least one backup DB arranged in a differing region somewhere, upon which it relies to satisfy access requests which it cannot currently complete owing to current active connection invalidity and replacement active components rebuilding.

Further, in some embodiments, some regional DB arrangements might have an association with more than one backup DB upon which it may rely to temporarily satisfy access requests. For example, an SR's arrangement may be configured to be able to rely on both the ER and WR in-memory DBs to satisfy SR access requests which are temporarily not able to be completed within the SR, owing to SR active connection invalidity and replacement active components rebuilding Still further, in some embodiments, a subject backup DB might serve as a backup DB for more than one (i.e., plural) DB arrangements. For example, a SR's in-memory DB may be used to act as a backup DB to satisfy ER access requests which are temporarily not able to be completed within the ER and also to satisfy WR access requests which are temporarily not able to be completed within the WR, owing to ER and WR active connection invalidity and replacement active components rebuilding.

Figure 11:
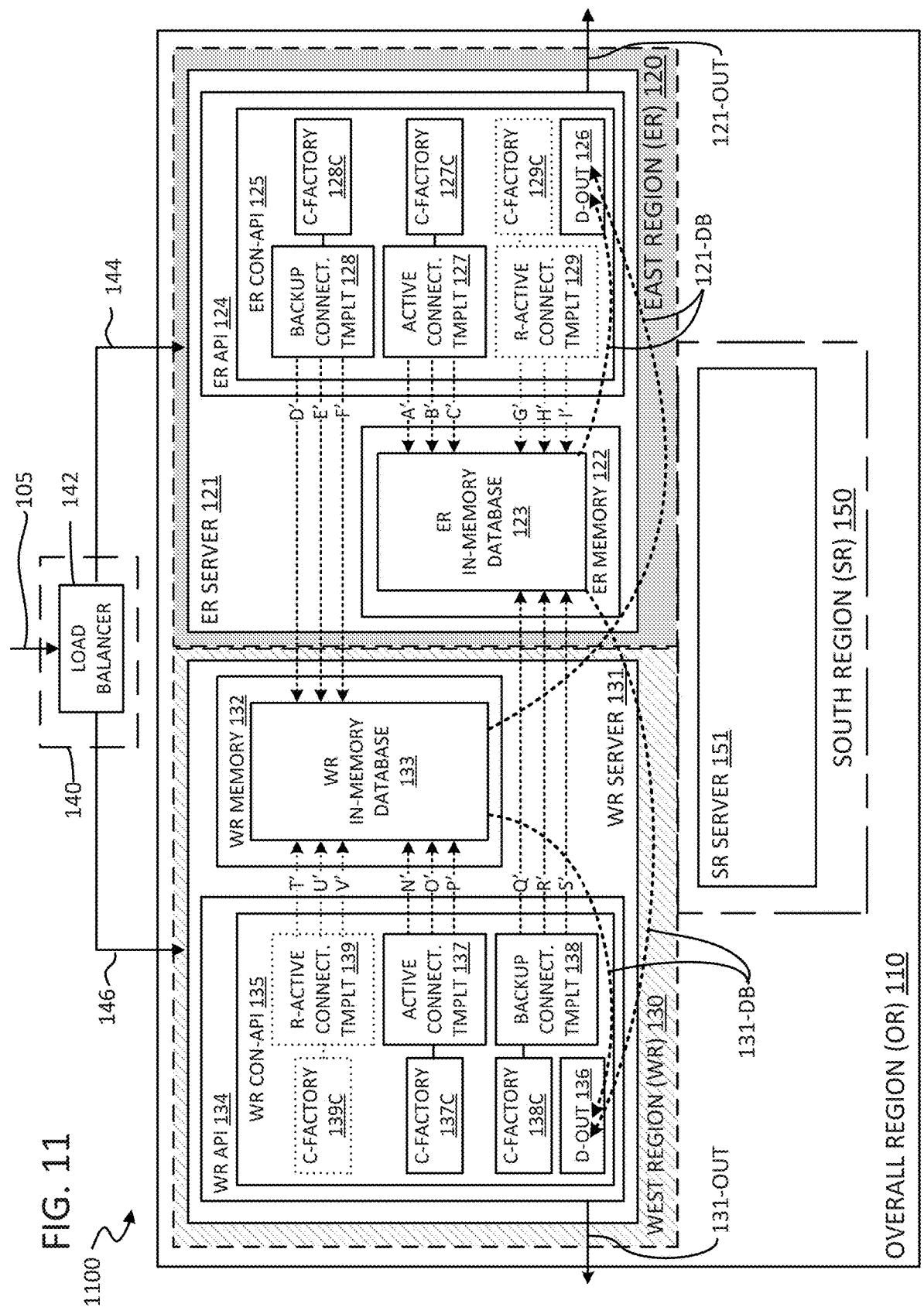
FIG. 11 illustrates a block diagram example of the FIG. 10 multi-regional in-memory DB system, further having in-memory DB requests sent to the in-memory DBs only in a first (e.g., input) direction via a connection pool, and in-memory DB outputs returned from the in-memory DB only in a second (e.g., output) direction via a dedicated output connection not included within the connection pool.

Next, FIG. 11 illustrates an example multi-regional in-memory DB system 1100 which is similar to the FIG. 10 multi-regional in-memory DB system, further having in-memory DB requests sent to the in-memory DBs only in a first (e.g., input) direction via an input connection pool, and in-memory DB outputs returned from the in-memory DB only in a second (e.g., output) direction via one or more dedicated output connection not included within the input connection pool. More particularly, FIG. 11's embodiment is similar in construction and operation to FIG. 10's embodiment, with the following exceptions.

First, while FIG. 10's connections A-I and N-V are bi-directional (meaning that data may travel in both directions thereon), FIG. 11's connections A'-I' and N'-V' may be uni-directional (meaning that access request data may travel in only one direction thereon). In some embodiments, access request data traveling through the connections A'-I' and N'-V' may travel only in a direction toward the in-memory DB. Accordingly, the connections A'-I' and N'-V' may be said to be input connection pools.

As a second difference, a data output component (e.g., D-OUT 126 and D-OUT 136) is further provided to each of the servers (e.g., ER server 121 and WR server 131). Further, at least one dedicated uni-directional output connection is provided between each in-memory DB and a data output component, to allow access request data output to travel uni-directionally from the in-memory DB to the data output component.

More particularly, a separate output connection 121-DB is illustrated in FIG. 11 as extending from the ER in-memory DB 123 to the D-OUT 126 component and another separate output connection 121-DB is illustrated extending from the WR in-memory DB 133 to the D-OUT 126 component. Similarly, a separate output connection 131-DB is illustrated in FIG. 11 as extending from the ER in-memory DB 123 to the D-OUT 136 component and another separate output connection 131-DB is illustrated extending from the WR in-memory DB 133 to the D-OUT 136 component.

In one embodiment, such connections may be any type of hardwired, wireless, optical, etc. path(s), or combination thereof. Further, although a single output connection is illustrated and described extending from each in-memory DB to the data output component for simplicity and brevity, the practice of embodiments is not limited to having only a single connection. For example, in some embodiments there may be two output connections, and in some embodiments, there may be more than two output connections.

The D-OUT 126 and 136 components are configured to operate as output interfaces, and output access request data received from the in-memory DBs, onto the output connections 121-OUT and 131-OUT, respectively.

The FIG. 11 embodiment is advantageous in terms of increasing a volume of access request data outputted by the in-memory DB systems. More particularly, in prior-described embodiments having pool connections operating bi-directionally, significant wait-time delay may have been incurred in that access request data (e.g., a get or read) would first be inputted toward an in-memory DB using an assigned bi-directional connection, and then wait-time would be incurred waiting for the in-memory DB to return the answer in the opposite direction along the same bi-directional connection. With the FIG. 11 embodiment, sequential access request data can be inputted one-after-another across one or more uni-directional input connection, and answers thereof can be returned along one or more dedicated uni-directional output connection.

For example, access request data (e.g., a get or read) can be inputted toward ER in-memory DB 123 using uni-directional connection A', and answer data therefore can be outputted from the ER in-memory DB 123 along the dedicated uni-directional output connection 121-DB. Thus, it can be seen that access data essentially flows to-and-from the in-memory DB in a looped path. Because the input connection does not have to wait for the return of an answer, no (or reduced) wait-time is incurred, and the assigned input connection can be released more quickly. Thus, a throughput of access requests handled by an in-memory DB is increased.

Figure 12:
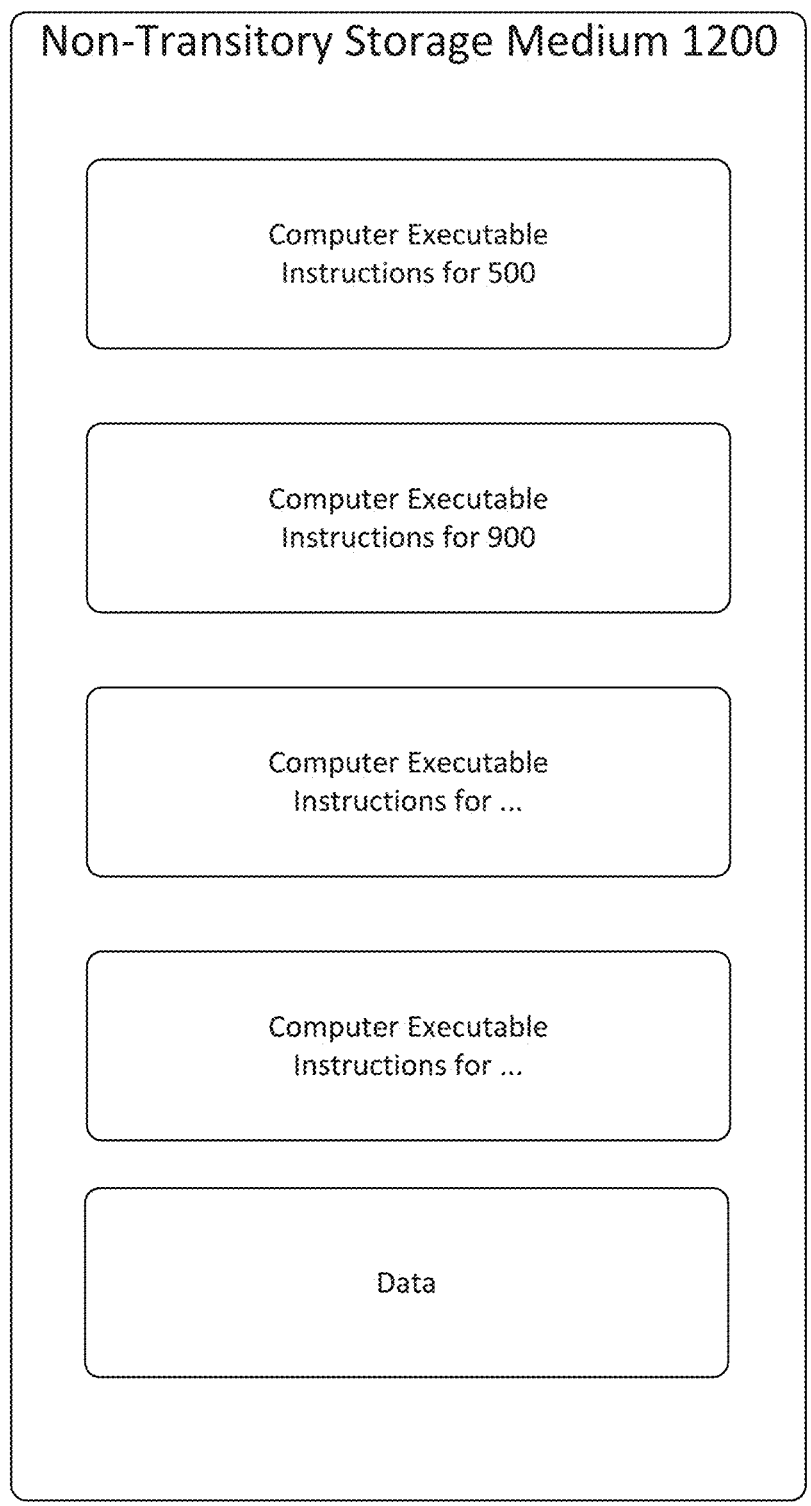
FIG. 12 illustrates an embodiment of a storage medium.

Next, FIG. 12 illustrates an embodiment of a storage medium 1200. Storage medium 1200 may include any non-transitory computer-readable storage medium or machine-readable storage medium, such as an optical, magnetic or semiconductor storage medium. In various embodiments, storage medium 1200 may include an article of manufacture. In some embodiments, storage medium 1200 may store computer-executable instructions, such as computer-executable instructions to implement one or more of logic flows or operations described herein, such as with respect to flow algorithms 500 of FIG. 5, and 900 of FIG. 9. Storage medium 1200 may also store further computer-executable instructions, such as computer-executable instructions to implement other logic flows or operations, and may also store data. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable types of code, such as source code, compiled code, interpreted code, executable code, static code, dynamic code, object-oriented code, visual code, and the like. The embodiments are not limited in this context.

Figure 13:
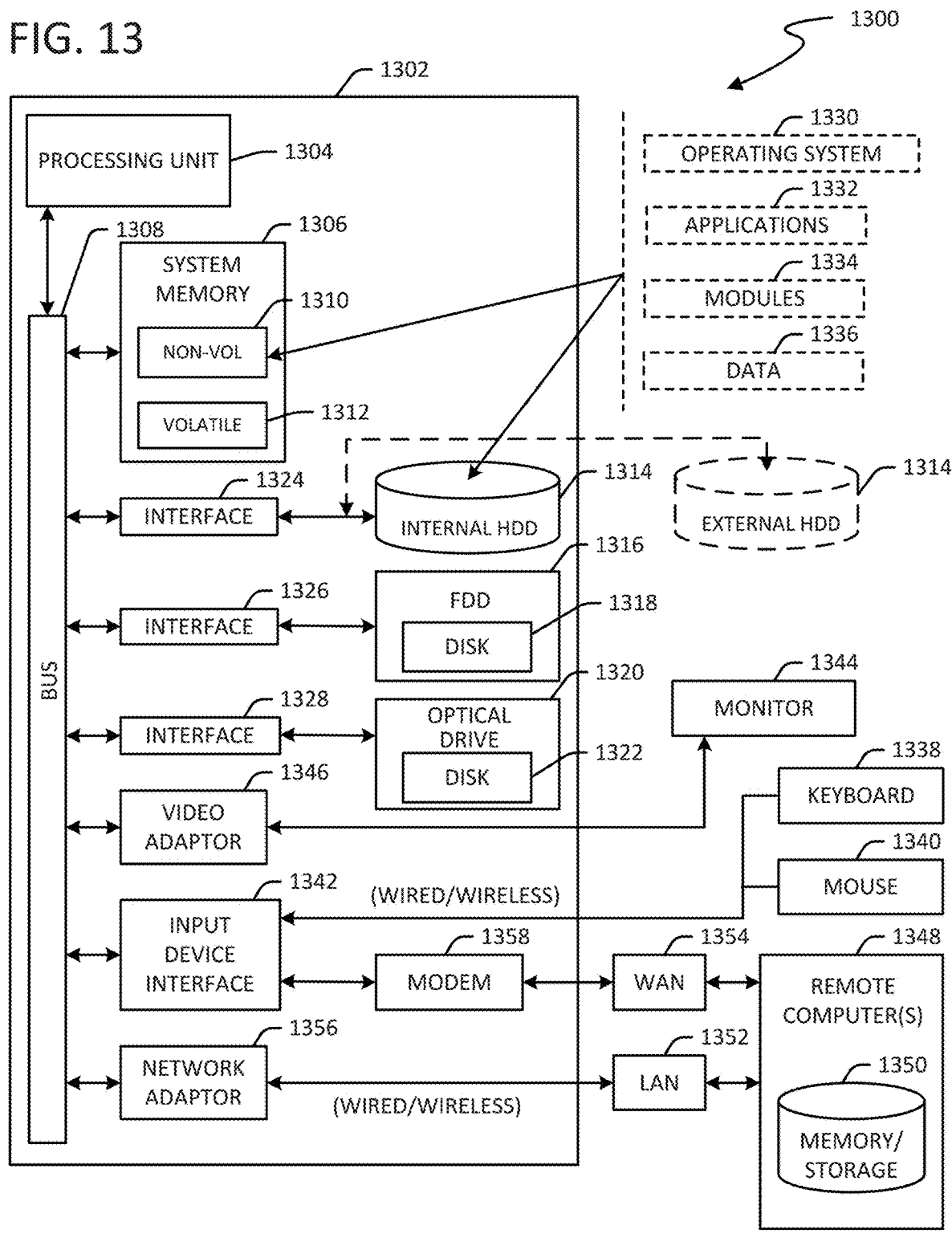
FIG. 13 illustrates an embodiment of a computing architecture such as a server.

FIG. 13 illustrates an embodiment of an exemplary computing architecture 1300 that may be suitable for implementing any of the components (e.g., computers, servers, client devices, etc.) of various embodiments as described anywhere within this disclosure. In various embodiments, the computing architecture 1300 may include or be implemented as part of an electronic device. In some embodiments, the computing architecture 1300 may be representative, for example, of a processor server that implements one or more components of the in-memory DB systems, such as the above-discussed components. In some embodiments, computing architecture 1300 may be representative, for example, of a computing device that implements one or more components of the east, west, south or load-balancer server arrangements. The embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 1300. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal.

Further embodiments, however, may alternatively employ data messages. Such data messages may be sent across various connections. Exemplary connections include parallel interfaces, serial interfaces, and bus interfaces.

The computing architecture 1300 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1300.

As shown in FIG. 13, the computing architecture 1300 includes a processing unit 1304, a system memory 1306 and a system bus 1308. The processing unit 1304 can be any of various commercially available processors, including without limitation an AMD® Athlon®, Duron®, and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 1304.

The system bus 1308 provides an interface for system components including, but not limited to, the system memory 1306 to the processing unit 1304. The system bus 1308 can be any of several types of bus structure that may further interconnect to a memory bus (with or without a memory controller), a peripheral bus, and a local bus using any of a variety of commercially available bus architectures. Interface adapters may connect to the system bus 1308 via a slot architecture. Example slot architectures may include without limitation, Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 1306 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 13, the system memory 1306 can include non-volatile memory 1310 and/or volatile memory 1312. A basic input/output system (BIOS) can be stored in the non-volatile memory 1310.

The computer 1302 may include various types of computer-readable storage media in the form of one or more lower speed memory units, including an internal (or external) hard disk drive (HDD) 1314, a magnetic floppy disk drive (FDD) 1316 to read from or write to a removable magnetic disk 1318, and an optical disk drive 1320 to read from or write to a removable optical disk 1322 (e.g., a CD-ROM or DVD). The HDD 1314, FDD 1316 and optical disk drive 1320 can be connected to the system bus 1308 by a HDD interface 1324, an FDD interface 1326 and an optical drive interface 1328, respectively. The HDD interface 1324 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1310, 1312, including an operating system 1330, one or more application programs 1332, other program modules 1334, and program data 1336. In one embodiment, the one or more application programs 1332, other program modules 1334, and program data 1336 can include, for example, the various applications and/or components of the aforementioned servers of the present disclosure.

A user can enter commands and information into the computer 1302 through one or more wire/wireless input devices, for example, a keyboard 1338 and a pointing device, such as a mouse 1340. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1304 through an input device interface 1342 that is coupled to the system bus 1308, but can be connected by other interfaces such as a parallel port, IEEE 994 serial port, a game port, a USB port, an IR interface, and so forth.

A monitor 1344 or other type of display device is also connected to the system bus 1308 via an interface, such as a video adaptor 1346. The monitor 1344 may be internal or external to the computer 1302. In addition to the monitor 1344, a computer typically includes other peripheral output devices, such as speakers, printers, and so forth.

The computer 1302 may operate in a networked environment using logical connections via wire and/or wireless communications to one or more remote computers, such as a remote computer 1348. The remote computer 1348 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1350 is illustrated. The logical connections depicted include wire/wireless connectivity to a local area network (LAN) 1352 and/or larger networks, for example, a wide area network (WAN) 1354. Such LAN and WAN networking environments are commonplace in offices and companies, and facilitate enterprise-wide computer networks, such as intranets, all of which may connect to a global communications network, for example, the Internet.

When used in a LAN networking environment, the computer 1302 is connected to the LAN 1352 through a wire and/or wireless communication network interface or adaptor 1356. The adaptor 1356 can facilitate wire and/or wireless communications to the LAN 1352, which may also include a wireless access point disposed thereon for communicating with the wireless functionality of the adaptor 1356.

When used in a WAN networking environment, the computer 1302 can include a modem 1358, or is connected to a communications server on the WAN 1354, or has other means for establishing communications over the WAN 1354, such as by way of the Internet. The modem 1358, which can be internal or external and a wire and/or wireless device, connects to the system bus 1308 via the input device interface 1342. In a networked environment, program modules depicted relative to the computer 1302, or portions thereof, can be stored in the remote memory/storage device 1350. It will be appreciated that the network connections shown are exemplary and other means of establishing a communications link between the computers can be used.

The computer 1302 is operable to communicate with wire and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 14:
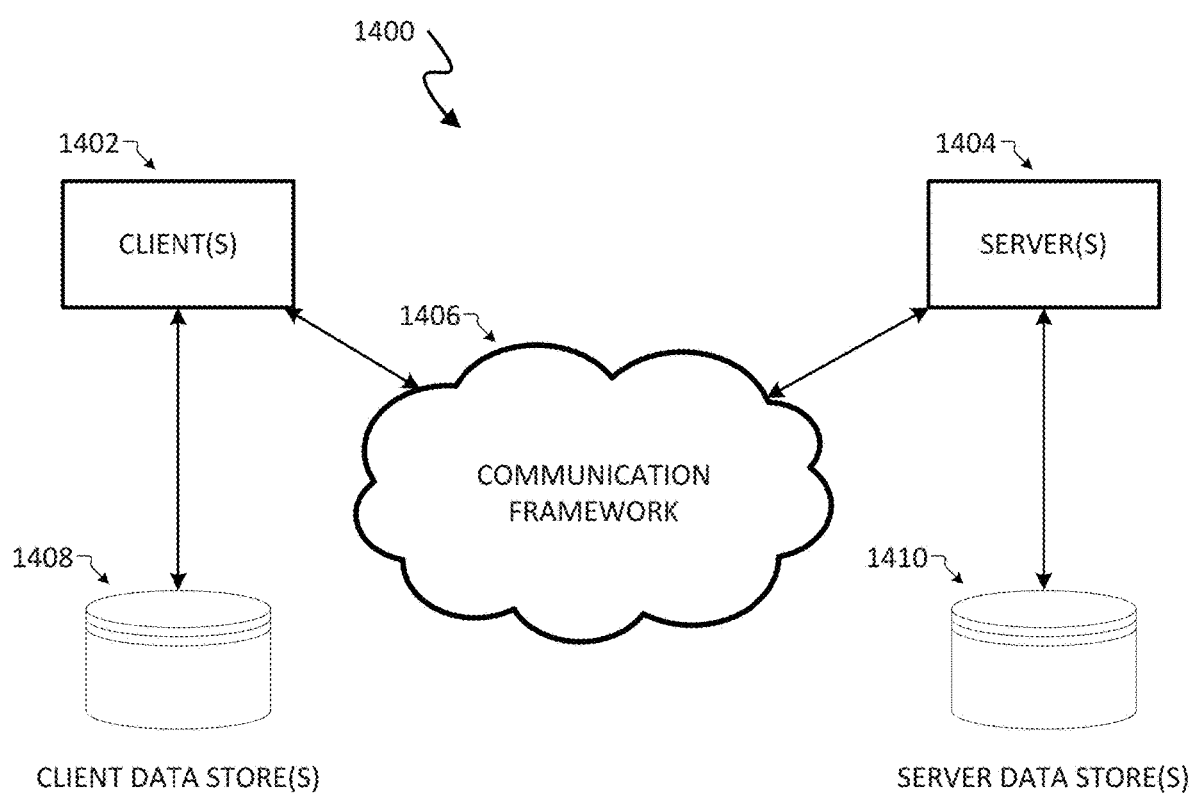
FIG. 14 illustrates an embodiment of a communications architecture.

FIG. 14 illustrates a block diagram of an exemplary communications architecture 1400 suitable for implementing various embodiments as previously described. The communications architecture 1400 includes various common communications elements, such as a transmitter, receiver, transceiver, radio, network interface, baseband processor, antenna, amplifiers, filters, power supplies, and so forth. The embodiments, however, are not limited to implementation by the communications architecture 1400.

As shown in FIG. 14, the communications architecture 1400 includes one or more clients 1402 and one or more servers 1404. The clients 1402 and the servers 1404 are operatively connected to one or more respective client data stores 1408 and server data stores 1410 that can be employed to store information local to the respective clients 1402 and servers 1404, such as cookies and/or associated contextual information. In various embodiments, any one of servers 1404 may implement one or more of logic flows or operations described herein, and storage medium in conjunction with storage of data received from any one of clients 1402 on any of server data stores 1410.

The clients 1402 and the servers 1404 may communicate information between each other using a communication framework 1406. The communications framework 1406 may implement any well-known communications techniques and protocols. The communications framework 1406 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1406 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1900 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1402 and the servers 1404. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Alternatively, the communication framework 1406 may be considered a "cloud". The term "cloud" is a shorthand reference to cloud computing infrastructure. The cloud includes one or more communication networks, such as the Internet, for example, and can further include portions of an industrial communications network, such as a local area network (LAN) or a wide area network (WAN). In cloud computing, a computing process may run on one or many connected cloud computers at the same time. In cloud computing, the cloud can host and run an application anywhere in the world. Further, the cloud enables access to the application from anywhere. Still further, the cloud may include a network or association of connected computer devices and digital electronic resources that can be used to perform processing and to relay communications.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

It should be appreciated that the example embodiments shown in the block diagram of several FIGS. may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments. Some examples may be described using the expression "in one example", "an example" or "in some embodiments" along with their derivatives. These terms mean that a particular feature, structure, or characteristic described in connection with the example is included in at least one example or embodiment. The appearances of the phrase "in one example" or "in some embodiments" in various places in the specification are not necessarily all referring to the same example or embodiment.

In the context of the present disclosure, unless expressly provided otherwise, numerical words like "first", "second", "third", etc. have been used as adjectives only for the purpose of allowing for distinction between the nouns that they modify from one another, and not for the purpose of describing any particular relationship between those nouns.

As may or may not have been mentioned previously, various features, operations, etc. of this invention may be practiced "simultaneously", "concurrently" or "parallelly". As used within a content of this invention, the term 'simultaneous' means that two things (e.g., collecting; analyzing, etc., of differing information) happen at the same time (i.e., at least partially occur or overlap in time), while the term 'concurrent' means that the two things may occur during the same period of time, but do not necessarily happen at the same time. Concurrent is the broader term, and may include instances of things occurring simultaneously. If two things (e.g., collecting; analyzing, etc., of differing information) overlap in time partially but not completely, the things may be described as occurring concurrently, while the overlapping portion may be described as occurring simultaneously. Further, the term "parallel" means that two things occur along two differing paths or via differing operations. Parallel may include instances which occur simultaneously, instances which occur concurrently, and/or instances occurring at wholly differing time periods.

In this disclosure, the term "real time" refers to a time scale that is substantially simultaneous to an item or instance which provoked a subsequent action. In contrast, the term "near real time" refers to a time scale that is slower than the time scale referred to as "real time," for example by about one or more orders of magnitude, or by requiring a finite amount of time (e.g., milliseconds) rather than being substantially simultaneous.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner and may generally include any set of one or more limitations as variously disclosed or otherwise demonstrated herein.

The invention claimed is:

1. A method of resiliently reconnecting during run-time, to an in-memory database (DB) within a multi-regional DB system responsive to a connection failure, the method comprising automated run-time operations of:

attempting, by a server of a first region, a transaction access to the in-memory DB providing DB access services to servers of the first region and concurrent backup DB access services to servers of a second region, using a preconfigured connection obtained from a connection pool set which includes plural preconfigured connections which are pre-readied in advance of the attempting;

monitoring for a failure connecting to the in-memory DB using the preconfigured connection;

responsive to a detected said failure:

causing the transaction access to be performed using a differing in-memory DB providing DB access services to the second region remote from the first region and the differing in-memory DB providing concurrent backup DB access services to the servers of the first region and active DB access services to the servers of the second region;

discarding all the preconfigured connections in the connection pool set; and creating plural new preconfigured connections which are pre-readied to connect to the in-memory DB, to establish a renewed connection pool set for transaction accesses to the in-memory DB;

discarding all the preconfigured connections in the connection pool set; and creating plural new preconfigured connections which are pre-readied to connect to the in-memory DB, to establish a renewed connection pool set for transaction accesses to the in-memory DB;

attempting a subsequent transaction access to the in-memory DB in the first region using a new preconfigured connection obtained from the renewed connection pool set; and completing the subsequent transaction access upon connecting to the in-memory DB using the new preconfigured connection, and wherein at least one of the discarding, creating, attempting and completing operations are at least partially conducted at a same time as the performing the transaction access is conducted.

2. The method as claimed in claim 1, wherein the causing the transaction access to be performed using the differing in-memory DB, comprising an automated runtime operation of:

forwarding of the transaction access to a backup entity providing DB access services using the second region of the multi-regional DB system.

3. The method as claimed in claim 1, comprising automated run-time operations of:

pre-establishing a template pre-readied in advance of the attempting the transaction access, the template including a pointer pointing access to the connection pool set;

the attempting the transaction access including utilizing the pointer to access the connection pool set for obtaining the preconfigured connection;

the discarding all preconfigured connections in the connection pool set, including discarding the pointer;

re-establishing a new template pre-readied in advance of the attempting the subsequent transaction access, the new template including a new pointer pointing access to the renewed connection pool set;

the attempting the subsequent transaction access including utilizing the new pointer to access the renewed connection pool set for obtaining the new preconfigured connection.

4. The method as claimed in claim 3, wherein the causing the transaction access to be performed using the differing in-memory DB, comprising an automated runtime operation of:
    forwarding of the transaction access to a backup entity providing DB access services using the second region of the multi-regional DB system.

5. The method as claimed in claim 3, comprising automated run-time operations of:
    pre-establishing a backup template pre-readied in advance of the attempting the transaction access, the backup template including a backup pointer pointing access to a backup connection pool set which includes plural preconfigured backup connections which are pre-readied to connect to the differing in-memory DB located in the second region remote from the first region;
    responsive to the causing the transaction access to be performed using the differing in-memory DB:
    utilizing the backup pointer to access the backup connection pool set for obtaining a preconfigured backup connection from the plural preconfigured backup connections;
    attempting the transaction access to the backup in-memory DB in the second region using the preconfigured backup connection; and
    completing the transaction access upon connecting to the backup in-memory DB using the preconfigured backup connection.

6. The method as claimed in claim 1, wherein each of the first region and the second region is a service realm of one of: a geographical region; a service domain; and a DB center.

7. A transaction access application embodied on a non-transitory processor-readable medium; the transaction access application when executed performing functions comprising resilient run-time reconnecting to an in-memory database (DB) cluster in an event of a connection failure to the in-memory DB cluster, the transaction access application including automated run-time operations of:
    attempting, by one of a plurality of servers of a first domain, a transaction access to the in-memory DB cluster using a preconfigured connection obtained from a connection pool set which includes plural preconfigured connections which are prereadied in advance of the attempting to provide connection to the in-memory DB duster, where the in-memory DB cluster provides DB access services using the first domain of a multi-domain system and concurrent backup DB access services to a plurality of servers of a second domain of the mufti-domain system;
    detecting a failure in connecting to the in-memory DB cluster using the preconfigured connection;
    responsive to a detected said failure:
    causing the transaction access to be performed using a differing in-memory DB cluster which provides DB access services using a second domain different from the first domain and the differing in-memory DB providing concurrent backup DB access services to the servers of the first domain and active DB access services to the servers of the second domain;
    discarding all the preconfigured connections in the connection pool set; and
    creating plural new preconfigured connections to connect to the in-memory DB cluster, to establish a renewed connection pool set for transaction accesses to the in-memory DB cluster; attempting a subsequent transaction access to the in-memory DB cluster in the first domain using a new preconfigured connection obtained from the renewed connection pool set; and
    completing the subsequent transaction access upon connecting to the in-memory DB cluster using the new preconfigured connection, and
    wherein at least one of the discarding, creating, attempting and completing operations are at least partially conducted at a same time as the performing the transaction access is conducted.

8. The transaction access application as claimed in claim 7, wherein the causing the transaction access to be performed using the differing in-memory DB cluster, comprising an automated run-time operation of;
    forwarding of the transaction access to a backup entity providing DB access services using the second domain of the multi-domain DB system.

9. The transaction access application as claimed in claim 7, comprising automated run-time operations of:
    pre-establishing a template pre-readied in advance of the attempting the transaction access, the template including a pointer pointing access to the connection pool set;
    the attempting the transaction access including utilizing the pointer to access the connection pool set for obtaining the preconfigured connection;
    the discarding all preconfigured connections in the connection pool set, including discarding the pointer;
    re-establishing a new template pre-readied in advance of the attempting the subsequent transaction access, the new template including a new pointer pointing access to the renewed connection pool set;
    the attempting the subsequent transaction access including utilizing the new pointer to access the renewed connection pool set for obtaining the new preconfigured connection.

10. The transaction access application as claimed in claim 9, wherein the causing the transaction access to be performed using the differing in-memory DB cluster, comprising an automated run-time operation of:
    forwarding of the transaction access to a backup entity providing DB access services using the second domain of the multi-domain DB system.

11. The transaction access application as claimed in claim 9, comprising automated run-time operations of:
    pre-establishing a backup template pre-readied in advance of the attempting the transaction access, the backup template including a backup pointer pointing access to a backup connection pool set which includes plural preconfigured backup connections which are pre-readied to connect to the differing in-memory DB cluster located in the second domain remote from the first domain;
    responsive to the causing the transaction access to be performed using the differing in-memory DB cluster:
    utilizing the backup pointer to access the backup connection pool set for obtaining a preconfigured backup connection from the plural preconfigured backup connections;
    attempting the transaction access to the backup in-memory DB cluster in the second domain using the preconfigured backup connection; and completing the transaction access upon connecting to the backup in-memory DB cluster using the preconfigured backup connection.

12. The transaction access application as claimed in claim 7, wherein each of the first domain and the second domain is a service realm of one of: a geographical region; a service domain; and a DB center.

13. A regional database (DB) system deployable in a multi-regional system, comprising:
 a hardware processor and non-transitory processor-readable medium configured to implement a regional DB application including functions for resilient run-time reconnecting to an in-memory DB cluster in an event of a connection failure to the in-memory DB cluster, the processor performing automated run-time operations of:
 pre-establishing a template in advance of attempting a transaction access, the template including a pointer pointing access to a connection pool set which includes plural preconfigured connections which are pre-readied to provide connection to the in-memory DB cluster, where the in-memory DB cluster is configured to provide DB access services using a first region of a multi-regional system;
 utilizing the pointer to access the connection pool set for obtaining a preconfigured connection from the plural preconfigured connections;
 attempting the transaction access to the in-memory DB cluster using the preconfigured connection;
 monitoring for a failure in connecting to the in-memory DB using the preconfigured connection;
 responsive to a detected said failure;
 causing the transaction access to be performed using a differing in-memory DB cluster of a second region different from the first region domain and the differing in-memory DB providing concurrent backup DB access services to a plurality of servers of the first domain and active DB access services to a plurality of servers of the second domain;
 discarding all the preconfigured connections in the connection pool set, via eliminating the pointer; and
 creating plural new preconfigured connections to connect to the in-memory DB cluster, to establish a renewed connection pool set for transaction accesses to the in-memory DB cluster;
 re-establishing a new template pre-readied in advance of the attempting a subsequent transaction access, the new template including a new pointer pointing access to the renewed connection pool set;
 utilizing the new pointer to access the renewed connection pool set for obtaining a new preconfigured connection from the plural new preconfigured connections;
 attempting the subsequent transaction access to the in-memory DB cluster in the first region, using the new preconfigured connection obtained from the renewed connection pool set connection; and
 completing the subsequent transaction access upon connecting to the in-memory DB cluster using the new preconfigured connection, and
 wherein at least one of the discarding, creating, attempting and completing operations are at least partially conducted at a same time as the performing the transaction access is conducted.

14. The regional database (DB) system as claimed in claim 13, wherein in the causing the transaction access to be performed using the differing in-memory DB duster, the processor performing automated run-time operations comprising:
 forwarding of the transaction access to a backup entity providing DB access services using the second region of the multi-regional DB system.

15. The regional database (DB) system as claimed in claim 13, the processor performing automated run-time operations comprising:
 pre-establishing a backup template pre-readied in advance of the attempting the transaction access, the backup template including a backup pointer pointing access to a backup connection pool set which includes plural preconfigured backup connections which are pre-readied to connect to the differing in-memory DB cluster located in the second region remote from the first region;
 responsive to the causing the transaction access to be performed using the differing in-memory DB duster:
 utilizing the backup pointer to access the backup connection pool set for obtaining a preconfigured backup connection from the plural preconfigured backup connections;
 attempting the transaction access to the backup in-memory DB cluster in the second region using the preconfigured backup connection; and
 completing the transaction access upon connecting to the backup in-mernory DB cluster using the preconfigured backup connection.

16. The regional database (DB) system as claimed in claim 13, wherein each of the first region and the second region is a service realm of one of: a geographical region; a service domain; and a DB center.

* * * * *

UNITED STATES PATENT AND TRADEMARK OFFICE
CERTIFICATE OF CORRECTION

PATENT NO. : 10,698,770 B1
APPLICATION NO. : 16/380179
DATED : June 30, 2020
INVENTOR(S) : Gopi Kancharla, Kush Patel and Nag Prajval Bindumalyam Chandrashekar Page 1 of 1

It is certified that error appears in the above-identified patent and that said Letters Patent is hereby corrected as shown below:

In the Claims

Column 24, Claim 3, Line 67; Please replace "the renewed connection pool set:" with --the renewed connection pool set;--

Column 25, Claim 7, Line 39; Please replace "processor-readable medium;" with --processor-readable medium,--

Column 25, Claim 7, Line 51; Please replace "DB duster" with --DB cluster--

Column 25, Claim 7, Lines 54-55; Please replace "domain of the mufti-domain system;" with --domain of the multi-domain system;--

Column 26, Claim 8, Line 19; Please replace "automated run-time operation of;" with --automated run-time operation of:--

Column 27, Claim 12, Line 6; Please replace "realm of one of; a geographical region" with --realm of one of: a geographical region--

Column 27, Claim 13, Line 33; Please replace "responsive to a detected said failure;" with --responsive to a detected said failure:--

Column 28, Claim 14, Line 17; Please replace "in-memory DB duster" with --in-memory DB cluster--

Column 28, Claim 15, Line 34; Please replace "in-memory DB duster" with --in-memory DB cluster--

Column 28, Claim 15, Line 43; Please replace "backup in-mernory DB" with --backup in-memory DB--

Signed and Sealed this
Thirteenth Day of October, 2020

Andrei Iancu
*Director of the United States Patent and Trademark Office*